(12) United States Patent
Eto et al.

(10) Patent No.: US 8,169,866 B2
(45) Date of Patent: May 1, 2012

(54) REPRODUCING POWER ADJUSTING METHOD, OPTICAL INFORMATION RECORDING/REPRODUCING APPARATUS AND INFORMATION RECORDING MEDIA

(75) Inventors: Soichiro Eto, Tokyo (JP); Toshimichi Shintani, Kodaira (JP); Hiroyuki Minemura, Kokubunji (JP)

(73) Assignee: Hitachi Comsumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/776,471

(22) Filed: May 10, 2010

(65) Prior Publication Data

US 2010/0290328 A1    Nov. 18, 2010

(30) Foreign Application Priority Data

May 12, 2009    (JP) ................................ 2009-115133

(51) Int. Cl.
  *G11B 7/00*    (2006.01)
(52) U.S. Cl. .................. 369/47.5; 369/53.26; 369/53.27
(58) Field of Classification Search ............... 369/53.26, 369/53.27, 47.5, 47.51
See application file for complete search history.

(56) References Cited

U.S. PATENT DOCUMENTS

| 2001/0005340 A1 | 6/2001 | Nishikawa |
| 2002/0034137 A1 | 3/2002 | Okumura et al. |
| 2007/0171805 A1 | 7/2007 | Shigeta et al. |
| 2008/0025190 A1* | 1/2008 | Yokoi et al. .............. 369/124.01 |
| 2009/0034391 A1* | 2/2009 | Aoki et al. .................... 369/100 |
| 2009/0080311 A1 | 3/2009 | Shintani et al. |

FOREIGN PATENT DOCUMENTS

| CN | 1992020 A | 7/2007 |
| JP | 2001-160232 | 6/2001 |
| JP | 2002-092994 | 3/2002 |

OTHER PUBLICATIONS

Chine Office Action dated Sep. 23, 2011 for Application No. 201010178264.8.

* cited by examiner

*Primary Examiner* — Adam R. Giesy
(74) *Attorney, Agent, or Firm* — Antonelli, Terry, Stout & Kraus, LLP.

(57) ABSTRACT

By referring to a table of reproducing conditions and medium specific parameters, stored in an optical disc or optical disc apparatus and/or generated by the optical disc apparatus, the medium specific parameters to be used for performing reproducing power adjustment are changed in accordance with the reproducing condition to execute reproducing power adjustment.

19 Claims, 11 Drawing Sheets

| REPRO-DUCING TYPE n | LAYER | RADIUS (mm) | LINEAR VELOCITY (m/s) | TEMPER-ATURE (°C) | OPC PARAMETER | | | | |
|---|---|---|---|---|---|---|---|---|---|
| | | | | | Pt(n) (mW) | Pmin(n) (mW) | Pmax(n) (mW) | At(n) (%) | Ai(n) (%) |
| 1 | L0 | 25~55 | 0~20 | <10 | 2.6 | 1.8 | 4.5 | 0.0 | -52.0 |
| 2 | | | | ≧10 | 2.0 | 1.2 | 4.0 | 0.0 | -40.0 |
| 3 | | | 20~40 | <10 | — | — | — | — | — |
| 4 | | | | ≧10 | 2.3 | 1.4 | 4.8 | 1.2 | -40.2 |
| 5 | | | 40~60 | <10 | — | — | — | — | — |
| 6 | | | | ≧10 | — | — | — | — | — |
| 7 | L1 | 25~55 | 0~20 | <10 | 3.4 | 2.2 | 5.2 | 3.0 | -65.0 |
| 8 | | | | ≧10 | 3.2 | 2.0 | 5.0 | 3.0 | -61.0 |
| 9 | | | 20~40 | <10 | — | — | — | — | — |
| 10 | | | | ≧10 | 3.3 | 2.1 | 5.1 | -3.5 | -61.3 |
| 11 | | | 40~60 | <10 | — | — | — | — | — |
| 12 | | | | ≧10 | — | — | — | — | — |

FIG.8

| REPRO-DUCING TYPE n | LAYER | RADIUS (mm) | LINEAR VELOCITY (m/s) | TEMPER-ATURE (°C) | OPC PARAMETER | | | | |
|---|---|---|---|---|---|---|---|---|---|
| | | | | | Pt(n) (mW) | Pmin(n) (mW) | Pmax(n) (mW) | At(n) (%) | Ai(n) (%) |
| 1 | L0 | 25~55 | 0~20 | <10 | 2.6 | 1.8 | 4.5 | 0.0 | -52.0 |
| 2 | | | | ≧10 | 2.0 | 1.2 | 4.0 | 0.0 | -40.0 |
| 3 | | | 20~40 | <10 | — | — | — | — | — |
| 4 | | | | ≧10 | 2.3 | 1.4 | 4.8 | 1.2 | -40.2 |
| 5 | | | 40~60 | <10 | — | — | — | — | — |
| 6 | | | | ≧10 | — | — | — | — | — |
| 7 | L1 | 25~55 | 0~20 | <10 | 3.4 | 2.2 | 5.2 | 3.0 | -65.0 |
| 8 | | | | ≧10 | 3.2 | 2.0 | 5.0 | 3.0 | -61.0 |
| 9 | | | 20~40 | <10 | — | — | — | — | — |
| 10 | | | | ≧10 | 3.3 | 2.1 | 5.1 | -3.5 | -61.3 |
| 11 | | | 40~60 | <10 | — | — | — | — | — |
| 12-1 | L1 | 20~45 | 40~60 | ≧10 | 3.0 | 1.5 | 4.6 | 1.7 | -50.7 |
| 12-2 | | 45~55 | | | 3.6 | 2.2 | 5.3 | 0.0 | -63.0 |

| NUMBER OF MONITOR PARAMETER | COMBINATION | | | | ENTRY |
|---|---|---|---|---|---|
| 1 | X1 | — | — | — | 1 |
|  | — | X2 | — | — | 2 |
|  | — | — | X3 | — | 3 |
|  | — | — | — | X4 | 4 |
| 2 | X1 | X2 | — | — | 5 |
|  | X1 | — | X3 | — | 6 |
|  | X1 | — | — | X4 | 7 |
|  | — | X2 | X3 | — | 8 |
|  | — | X2 | — | X4 | 9 |
|  | — | — | X3 | X4 | 10 |
| 3 | X1 | X2 | X3 | — | 11 |
|  | X1 | X2 | — | X4 | 12 |
|  | X1 | — | X3 | X4 | 13 |
|  | — | X2 | X3 | X4 | 14 |
| 4 | X1 | X2 | X3 | X4 | 15 |

| ENTRY | COEFFICIENT | | | |
|---|---|---|---|---|
|  | X1 | X2 | X3 | X4 |
| 1 | 1 | — | — | — |
| 2 | — | 1 | — | — |
| 3 | — | — | 1 | — |
| 4 | — | — | — | 1 |
| 5 | a1 | a2 | — | — |
| 6 | b1 | — | b3 | — |
| 7 | c1 | — | — | c4 |
| 8 | — | d2 | d3 | — |
| 9 | — | e2 | — | e4 |
| 10 | — | f3 | — | f4 |
| 11 | a'1 | a'2 | a'3 | — |
| 12 | b'1 | b'2 | — | b'4 |
| 13 | c'1 | — | c'3 | c'4 |
| 14 | — | d'2 | d'3 | d'4 |
| 15 | a"1 | a"2 | a"3 | a"4 |

※ SUM OF COEFFICIENTS OF EACH ENTRY IS 1

REPRODUCING POWER ADJUSTING METHOD, OPTICAL INFORMATION RECORDING/REPRODUCING APPARATUS AND INFORMATION RECORDING MEDIA

INCORPORATION BY REFERENCE

The present application claims priority from Japanese application JP2009-115133 filed on May 12, 2009, the content of which is hereby incorporated by reference into this application.

BACKGROUND OF THE INVENTION

The present invention relates to a reproducing power adjusting method, an optical information recording/reproducing apparatus and an information recording medium, and more particularly to a reproducing power adjusting method using super-resolution techniques of reproducing pits of a size smaller than an optical resolution with laser radiation heat, an optical information recording/reproducing apparatus having a unit for adjusting a reproducing power, and an information recording medium storing information to be used for performing reproducing power adjustment.

Optical discs are widely used as information recording media. Signals are recorded in an optical disc or recorded signals are reproduced by condensing a laser light beam with an objective lens and radiating the condensed laser beam to an information recording layer of an optical disc. A size of a condensed spot, on an optical disk is represented by $\lambda/4$ NA where $\lambda$ is a wavelength of a laser beam and NA is an numerical aperture of an objective lens. If recurrent patterns of data pits and spaces having the same length are reproduced by using the $\lambda/4$ NA spot, the minimum size of a data pit being able to obtain a finite reproduced signal amplitude is $\lambda/4$ NA. A size smaller than $\lambda/4$ NA is called a size smaller than an optical resolution. According to conventional optical disc technologies represented by CDs, DVDs, HD-DVDs, Blu-ray Discs (BDs), the minimum size of a data pit is set to an optical resolution or larger. High density recording of a conventional optical disc has been attained by shorter wavelength of a laser beam. For example, for CD having a record capacity of 0.65 GB, a wavelength of a laser beam is 780 nm, and for BD having a record capacity of 25 GB, a wavelength of a laser beam is 405 nm. In addition, high density recording is realized by increasing a numerical aperture of an objective lens from 0.5 to 0.85 to reduce the size of a condensed spot. In order to increase the capacity per one optical disc, multilayer providing two information layers realizes large capacities of 8.5 GB, 30 GB and 50 GB of DVD, HD-DVD, and BD respectively. In reproducing a multilayer disc, laser radiation is focused to each layer.

As one method of realizing high density recording other than that described above, super-resolution techniques have been proposed. According to super-resolution techniques, it becomes possible to reproduce pits of a size smaller than an optical resolution, by providing some mechanism to an optical disc medium. As a laser beam is radiated to an optical disc having a phase transition film formed on a ROM type substrate, thermal distribution in an optical spot melts only a portion of phase transition material in the spot so that optical characteristics change: such as a refractive index and a reflection ratio of only a portion of the phase transition material. As a reproducing beam is radiated to a region including an area having different optical characteristics, a state of a reflected beam changes greatly more than the region not including an area having different optical characteristics. It is therefore possible to reproduce pits of a size smaller than an optical spot, i.e., pits of a size smaller than an optical resolution. Super-resolution techniques are therefore techniques of reproducing fine pits with reproducing laser radiation heat. Substance to be used for realizing super-resolution and changing optical characteristics with temperature is called super-resolution substance, and a super-resolution substance film formed on an optical disc is called a super-resolution film. In super-resolution reproducing, an area having different optical characteristics of a medium in an optical spot radiation area is called a super-resolution spot. Reproducing a pit or record mark of a size of an optical resolution or larger is called normal resolution reproducing. Conventional optical disc techniques of reproducing products such as CDs, DVDs, HD-DVDs, BDs are all normal resolution reproducing.

It is known that in super-resolution reproducing by super-resolution techniques, the quality of a reproduced signal changes with a reproducing power. This is because a reproducing power changes the state of a super-resolution spot, e.g., the size, shape and the like. In super-resolution reproducing, there exists therefore an optimum reproducing power which optimizes the state of a super-resolution spot and realizes optimum reproducing. The optimum reproducing power changes with a type and sensitivity of super-resolution substance of a medium, a reproducing linear velocity, an environment temperature and the like during reproducing. The reason for this is as follows. If any of the above-described factors is different, an optimum state of a super-resolution spot is also different so that a radiation amount of a reproducing laser beam necessary for obtaining an optimum super-resolution spot becomes different. The factors changing an optimum reproducing power in super-resolution reproducing, including the above-described type and sensitivity of super-resolution substance of a medium, reproducing linear velocity, environment temperature and the like during reproducing, are collectively called hereinafter reproducing conditions.

As the optimum reproducing condition is determined, super-resolution reproducing is performed by using the optimum reproducing power under the determined optimum reproducing condition to realize optimum reproducing. However, in actual optical disc reproducing, the reproducing condition may be changed during a reproducing operation. For example, a sensitivity of a medium may change with a radius of an optical disc, resulting from a thickness difference between the inner and outer circumference sides of a super-resolution film formed on a substrate or from other reasons. In such a case, reproducing power adjustment is required to change a reproducing power to an optimum reproducing power during a reproducing operation.

JP-A-2002-92994 describes that in super-resolution reproducing for magneto optical recording, test data is reproduced at different reproducing powers, reproducing powers allowing each error rate to become about an error rate capable of being corrected by an error correcting unit, and resolutions corresponding to the reproducing powers (resolution being an amplitude ratio of the shortest signal to the longest signal), are stored in a memory, a resolution is calculated from the reproduced signals during super-resolution reproducing, and compared with a resolution (hereinafter called a target resolution) acquired during test reading, and if the resolution varies from the target resolution, the reproducing power is changed to make the resolution become coincident with the target resolution. A resolution during the reproducing operation becomes therefore always constant, and the reproducing power is always the optimum reproducing power, realizing optimum reproducing.

JP-A-2001-160232 discloses a reproducing power adjusting method using as an observation index for observing a change in the reproducing condition of super-resolution reproducing, a carrier level normalized by a reproducing power. In the invention disclosed in JP-A-2001-160232, the reproducing power is adjusted in such a manner that a signal level (carrier level) normalized by a reproducing power becomes coincident with the target value. Since the signal level is a level capable of being acquired from a reproduced signal during the reproducing operation, the signal level is able to be used also as the observation index for a super-resolution reproducing condition.

As described above, it is possible to realize optimum reproducing of super-resolution reproducing by performing reproducing power adjustment for changing a reproducing power always to the optimum reproducing power in accordance with the reproducing condition.

SUMMARY OF THE INVENTION

As described above, since an optimum reproducing power of super-resolution reproducing changes with the reproducing condition, it is necessary to adjust a reproducing power in order to realize optimum reproducing. However, depending upon a type of a change in the reproducing condition, the above-described reproducing power adjustment may become unable to realize optimum reproducing.

FIG. 1 illustrates an example of a relation between a reproducing linear velocity and a bit error ratio (bER) when the above-described reproducing power adjustment is performed in super-resolution reproducing. As a monitor parameter, asymmetry is used representing a shift amount of center values of the longest and shortest signals, and FIG. 1 illustrates also an asymmetry value at each reproducing linear velocity. The "monitor parameter" is a parameter which reflects the state of a super-resolution spot, is used for performing reproducing power adjustment, and is able to be acquired always during a reproducing operation, such as a resolution and a carrier level. These parameters are collectively called hereinafter a monitor parameter.

Reproducing power adjustment illustrated in FIG. 1 was performed by using as a target value an asymmetry value of −1.5% capable of obtaining an optimum reproduced signal at a reproducing linear velocity of 5 m/s. Reproducing is able to be realized at linear velocities of 5 to 20 m/s because bER is a reproducing limit $bER=1\times10^{-5}$ or smaller. However, optimum reproducing is unable at linear velocities of 25 to 50 m/s because bER is larger than the reproducing limit bER although the asymmetry is coincident with the target value. The reason for this resides in that a fixed value is used as the asymmetry target value to be used for reproducing power adjustment. The reasons will be described in the following.

As a reproducing linear velocity changes, an optimum state of a super-resolution spot at an optimum reproducing power, particularly an optimum shape, becomes different. More specifically, since a super-resolution spot is in a high temperature region of a medium in an optical spot, the spot has an approximately circular shape at a low linear velocity, whereas at a high linear velocity the spot has a shape trailing backwards relative to a spot traveling direction. Inter-code interference is therefore likely to occur at a high linear velocity as compared to a low linear velocity. If a signal having the same length is reproduced at low and high linear velocities, signal levels are different. Since an asymmetry value is calculated from signal levels, different reproducing linear velocities produce different asymmetry target values. Since the asymmetry fixed target value is used, optimum reproducing is not therefore realized at a high linear velocity in reproducing power adjustment illustrated in FIG. 1.

Even if the monitor parameter for performing reproducing power adjustment is changed from an asymmetry value to a resolution, a carrier level, a signal amplitude, a modulation factor, a signal level or the like, optimum reproducing is unable to be realized when the reproducing linear velocity changes, from the same reasons described above.

Although a change in a reproducing linear velocity is used as a change in the reproducing condition in the above description, a change other than a reproducing linear velocity, such as a change in a sensitivity, structure or material of a medium and a change in an environment temperature may not realize optimum reproducing if reproducing power adjustment is performed by using a fixed monitor parameter target value. Consider, for example, the case of a change in a reproducing layer during reproducing a two-layer medium made of different materials. In this case, each layer has a different thermal diffusion velocity and a different super-resolution spot shape during reproducing. The monitor parameter target value in optimum reproducing is therefore different, and if a fixed target value is used, optimum reproduced signals are unable to be obtained from both the layers. Also a change in the environment temperature changes a thermal diffusion velocity of each information layer. Optimum reproducing is unable to be realized by performing reproducing power adjustment using the fixed monitor parameter target value, because of the same reasons described above.

As above, if reproducing power adjustment is performed in super-resolution reproducing by using a fixed monitor parameter target value, optimum reproducing may not be realized if the reproducing condition is changed.

The above-described issues associated with reproducing power adjustment in super-resolution reproducing are settled by changing a parameter used by reproducing power adjustment in accordance with the reproducing condition. Namely, the issues are settled by referring to optimum power control (OPC) parameter information containing a monitor parameter target value and corresponding to the reproducing condition held by the optical information recording/reproducing apparatus and/or optical information recording medium, and changing the OP parameters in accordance with the reproducing condition to perform reproducing power adjustment. The OPC parameters are parameters of fixed values specific to a medium, to be used when an optimum reproducing power is determined, and include a monitor parameter target value and fixed values of parameters to be used for performing reproducing power adjustment.

The present invention may be understood also from the following aspect. In a conventional reproducing power adjusting method, assuming that the relation between an observation index indicating a state of super-resolution reproducing and a reproducing power is in a fixed state, i.e., assuming that the relation between the observation index and reproducing power is uniquely represented by a fixed relational formula, when a reproducing condition changes, an optimum reproducing power is searched by using the fixed relational formula. On the other hand, in the present invention, when a reproducing state of super-resolution changes, it is considered that the relation itself between an observation index and a reproducing power, i.e., the relational formula itself, has changed, and the relation itself between the observation index and a reproducing power after a change in the reproducing condition is searched again, and a reproducing power is adjusted in accordance with the searched relation.

More specifically, the reproducing power is adjusted so as to make the monitor parameter be coincident with a value before the reproducing condition changes, basing upon the searched relation between the monitor parameter and reproducing power.

The present invention provides a reproducing power adjusting method, an optical disc apparatus and an optical disc medium capable of always obtaining optimum reproduced signals in super-resolution techniques of reproducing a pit of a size smaller than an optical resolution with laser radiation heat.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram illustrating an example of an OPC parameter table in which the reproducing conditions and OPC parameters are added.

DETAILED DESCRIPTION OF THE INVENTION

Figure 1:
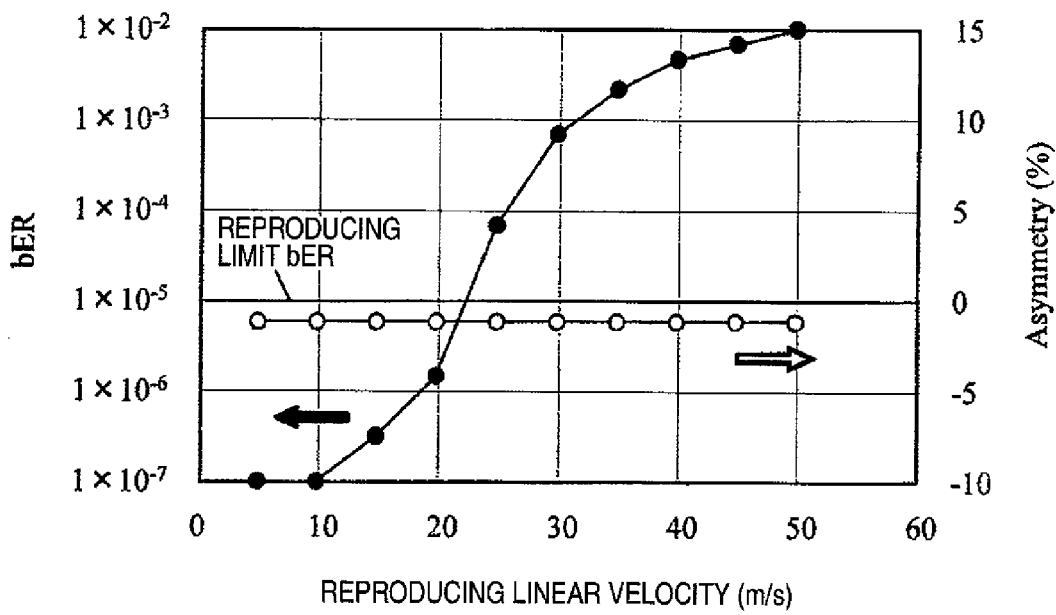
FIG. 1 is a graph illustrating a relation between a reproducing linear velocity, a bER and an asymmetry value of reproduced signals wherein a reproducing power in super-resolution adjustment is adjusted so as to make an asymmetry value become coincident with a fixed target value.

Prior to describing embodiments of the above-described invention, the constitution of the invention will be described.

In the following embodiments, a super-resolution optical disc capable of being subjected to super-resolution reproducing is reproduced with an optical disc apparatus. Management information for a super-resolution optical disc is recorded by signals whose information is able to be acquired by normal resolution reproducing, and user information is recorded by signals requiring super-resolution reproducing.

Prior to reproducing user information recorded in an optical disc, an optical disc apparatus performs reproducing adjustment similar to convention optical disc techniques, for example, adjustment of lens tilt, spherical aberration or the like, to reproduce management information of the optical disc and acquire information necessary for adjustment of a super-resolution reproducing operation: at least OPC parameters corresponding to each of the reproducing conditions. In accordance with the acquired management information, the optical disc apparatus moves a laser radiation position to a reproducing region, and in order to perform super-resolution reproducing of this region, performs conventional reproducing adjustment similar to that described above, and in addition adjustment of a reproducing power for super-resolution reproducing. This reproducing power adjustment is performed so as to make the monitor parameter become coincident with the monitor parameter target value, by using the above-described OPC parameters corresponding to the reproducing condition, the above-described monitor parameter and a present reproducing power. The reproducing power adjustment is performed if necessary during reproducing.

The monitor parameter may be one of a resolution, a carrier level, an asymmetry value, a modulation factor and a signal level, or a combination of these. The resolution is calculated, for example, as an amplitude ratio of the shortest signal to the longest signal. The carrier level is calculated, for example, as a value of a carrier level of the shortest signal normalized by the reproducing power. The asymmetry value is calculated, for example, as a difference between center amplitudes of the shortest and longest signals divided by an amplitude of the longest signal. The modulation factor is calculated as a value of an amplitude divided by high envelope. The signal level is calculated, for example, as a value of a signal level of the longest signal of a space normalized by a reproducing power.

The above-described monitor parameter is an index reflecting a thermal efficiency of energy radiated to an optical disc or reflecting a heat quantity absorbed in a super-resolution film. Optimizing a reproducing power in accordance with the monitor parameter is to compensate a radiating energy in accordance with a variation in the heat quantity absorbed in the super-resolution film or in the thermal efficiency.

There is a relation (hereinafter called relational characteristics) between each of various monitor parameters and a reproducing power, and the relational characteristics are able to be represented by various functions. A change in the reproducing condition changes a function representative of the relational characteristics and the target value of a monitor parameter. Therefore, the reproducing power adjustment is performed in such a manner that the monitor parameter becomes coincident with the target value under each of the reproducing conditions, by using each function corresponding to each reproducing condition.

Figure 2:
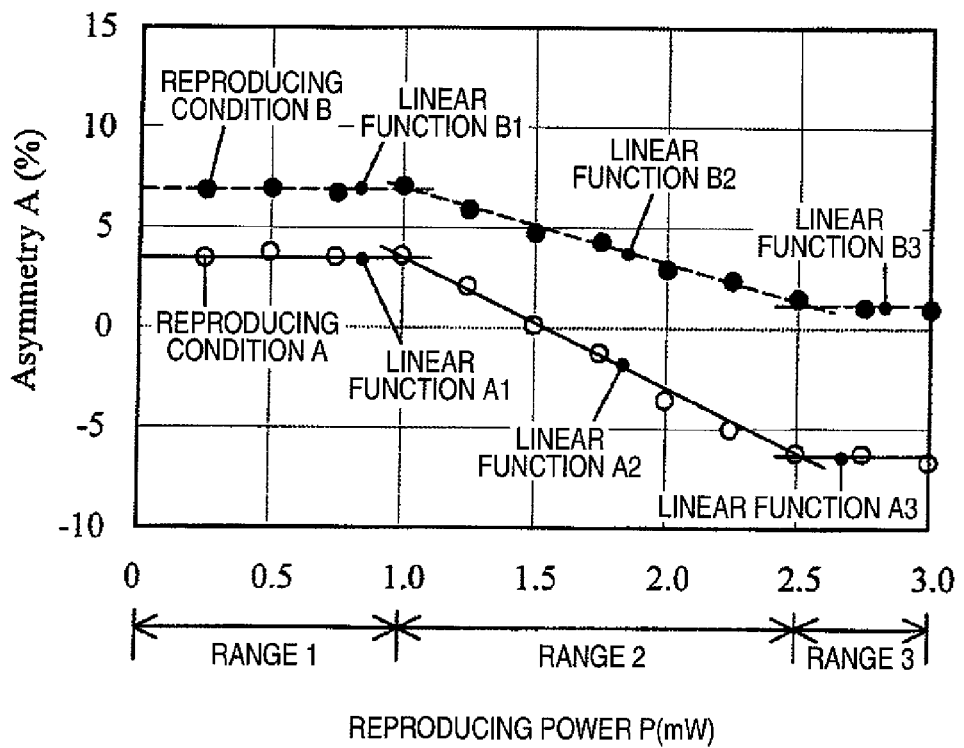
FIG. 2 is a diagram illustrating an example of results of approximating a relation between a reproducing power and an asymmetry value under reproducing conditions A and B by linear functions in predetermined reproducing ranges.

The relational characteristics between the monitor parameter and reproducing power change in various ways depending upon monitor parameters: being represented by functions similar to a linear function, a quadratic function and the like, and functions similar to a plurality of complicatedly classified functions. However, if functions are classified in predetermined reproducing power ranges, each function is able to be approximated to a linear function in each reproducing power range, and moreover, if the reproducing condition is fixed, a linear function in each reproducing power range is determined uniquely. FIG. 2 illustrates the relational characteristics between a reproducing power P and an asymmetry value A under the reproducing conditions A and B. FIG. 2 illustrates also linear functions classified in reproducing power ranges. The reproducing power ranges 1 to 3 correspond to linear functions A1 to A3 in the reproducing range A, and to linear functions B1 to B3 in the reproducing range B. It is possible to know from FIG. 2 that the relational characteristics between the reproducing power and monitor parameter are represented by a linear function in each reproducing power range, and that the linear function is dependent upon the reproducing condition. The reproducing power adjustment is therefore performed in such a manner that the monitor parameter is made coincident with the target value by using the reproducing power range and linear function corresponding to each reproducing condition.

Description will now be made on a detailed reproducing power adjusting method. The reproducing power adjusting method changes with a type of a change in the reproducing condition. The reproducing power adjusting method will be described by classifying the method into two methods in accordance with the type of a change in the reproducing condition.

Figure 3A:
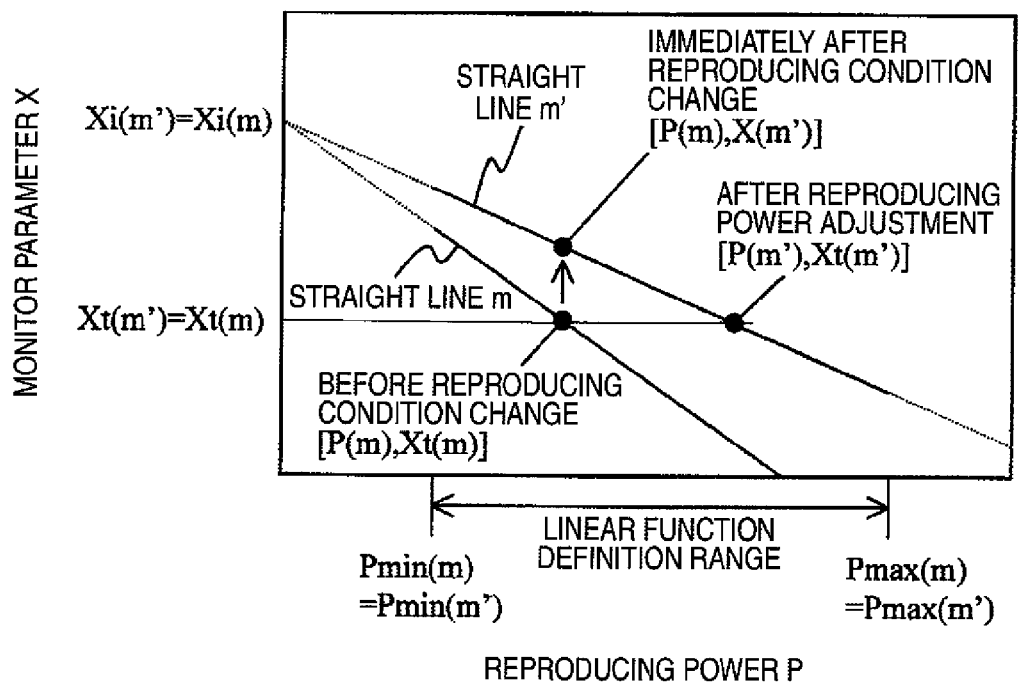
FIG. 3A is a diagram illustrating an example that a change in the reproducing condition changes linear functions representative of the relational characteristics between a reproducing power and a monitor parameter, wherein the linear functions before and after a change in the reproducing condition have the same reproducing power lower limit value Pmin, same reproducing power upper limit value Pmax, same monitor parameter target value Xt and same monitor parameter intercept Xi.

First, description will be made on a change in the linear function from a straight line m to a straight line m' when the reproducing condition changes from m to m' as illustrated in FIG. 3A. In FIG. 3A, a reproducing power lower limit value Pmin and a reproducing power upper limit value Pmax indicate the upper and lower limits of a range in which linear functions are defined, and X, Xt and Xi represent a monitor parameter, a monitor parameter target value and a y intercept of each linear function. Indices in respective brackets indicate the reproducing conditions. In the following, a y intercept of the linear function is called a monitor parameter intercept Xi. A change in the reproducing condition illustrated in FIG. 3A is characterized in that the monitor parameter target value Xt and monitor parameter intercept Xi of the straight lines m and m' and the reproducing power lower limit value Pmin and reproducing power upper limit value Pmax are equal before and after a change in the reproducing condition. Immediately after the reproducing condition change, the monitor parameter X(m') is different from the target value Xt(m') so that optimum reproducing is unable to be realized. It is therefore necessary for performing reproducing power adjustment to calculate an optimum reproducing power providing the monitor parameter target value Xt(m') and set again the reproducing power. As seen from FIG. 3A, the relations immediately after the reproducing condition change and after reproducing power adjustment are represented by the following equations (1) and (2):

$$X(m') = \alpha(m') \times P(m) + Xi(m') \quad (1)$$

$$Xt(m') = \alpha(m') \times P(m') + Xi(m') \quad (2)$$

α represents a slope of the linear function. The reproduction condition change illustrated in FIG. 3A satisfies also Pmin(m)=Pmin(m'), Pmax(m)=Pmax(m'), Xt(m)=Xt(m') and Xi(m)=Xi(m'). By using these relations, the equations (1) and (2) are rearranged to eliminate α and obtain the following equation (3):

$$P(m') = \frac{Xt(m) - Xi(m)}{X(m') - Xi(m)} P(m) \quad (3)$$

Since the equation (3) gives an optimum reproducing power P(m') after the reproducing condition change, the calculated P(m') is newly set to the reproducing power to realize the reproducing power adjustment. The reproducing power P(m) and monitor parameter X(m') used for calculating P(m') of the equation (3) are obtained during the reproducing operation, and the monitor parameter target value Xt(m) and monitor parameter intercept Xi(m) are fixed values of the reproducing condition before the reproducing condition change. For a change in the reproducing condition illustrated in FIG. 3A, because the monitor parameter target value Xt and monitor parameter intercept Xi of the reproducing condition at the reproducing start are known, it is possible to always calculate the optimum reproducing power from the equation (3) and realize optimum reproducing. The reproducing power set at the reproducing start is called a recommended reproducing power Pt which is the optimum reproducing power of the reproducing condition at the reproducing start.

Figure 3B:
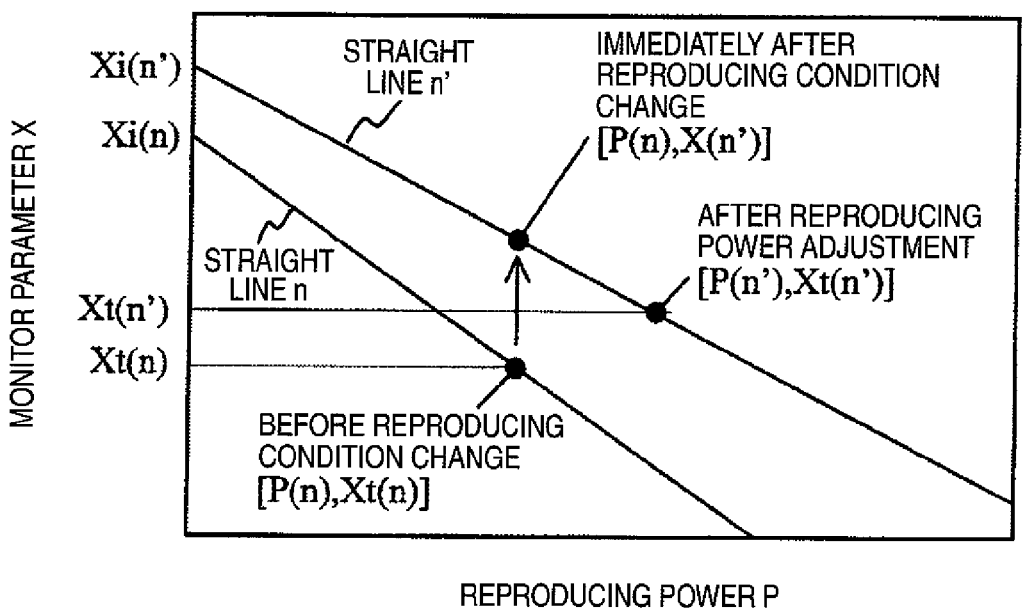
FIG. 3B is a diagram illustrating an example that a change in the reproducing condition changes linear functions representative of the relational characteristics between a reproducing power and a monitor parameter, wherein the linear functions before and after a change in the reproducing condition have different monitor parameter target values Xt and different monitor parameter intercepts Xi.

Next, description will be made on another reproducing condition change different from the change described above. In FIG. 3B, monitor parameter target values Xt and monitor parameter intercepts Xi of straight lines n and n' are different before and after the reproducing condition change. Also in this case, although the equations (1) and (2) are satisfied, Xt(n)≠Xt(n') and Xi(n)≠Xi(n') so that the following equation (4) is obtained by rearranging the equations (1) and (2):

$$P(n') = \frac{Xt(n') - Xi(n')}{X(n') - Xi(n')} P(n) \quad (4)$$

As different from the case of FIG. 3A, it is therefore necessary to use the monitor parameter target value Xt(n') and monitor parameter intercept Xi(n') after the reproducing condition change in order to calculate an optimum reproducing power P(n') after the reproducing condition change. Therefore, for the reproducing power adjustment regarding the reproducing condition change illustrated in FIG. 3B, the monitor parameter target value Xt and monitor parameter intercept Xi are changed once after the reproducing condition change to calculate the optimum reproducing power P(n') from the equation (4). By setting P(n') to the reproducing power, optimum reproducing is realized after the reproducing condition change. Although different monitor parameter target values Xt and different monitor parameter intercepts Xi have been described, it is needless to say that if different reproducing power lower limit values Pmin and different reproducing power upper limit values Pmax are used, Pmin and Pmax are required to be changed after the reproducing condition change.

A calculation equation for an optimum reproducing power is summarized for both the reproducing conditions changes illustrated in FIGS. 3A and 3B as in the following equation (5):

$$P(n', m') = \frac{Xt(n') - Xi(n')}{X(n', m') - Xi(n')} P(n, m) \quad (5)$$

In this equation, an index representative of the reproducing condition change illustrated in FIG. 3A is represented by m, an index representative of the reproducing change illustrated in FIG. 3B is represented by n, and the reproducing states after the reproducing condition changes are represented by m' and n', respectively. As seen from the equation (5), if the reproducing state is n=n' (if there is no reproducing condition change in FIG. 3B), the optimum reproducing power P(n, m') is obtained without changing the OPC parameters, whereas if the reproducing state is n≠n" (if there is a reproducing condition change as in FIG. 3B), the optimum reproducing power P(n', m') is obtained by changing the OPC parameters. Optimum reproducing in super-resolution reproducing is therefore realized always through reproducing power adjustment using the optimum reproducing power calculated from the equation (5).

As described above, the reproducing power adjustment uses the medium specific value, monitor parameter target value Xt, monitor parameter intercept Xi, recommended reproducing power Pt, reproducing power lower limit value Pmin and reproducing power upper limit value Pmax, respectively corresponding to the particular reproducing condition and reproducing power range. These values are fixed parameters of the reproducing power adjustment, and correspond to the above-described OPC parameters. Of the OPC parameters, the monitor parameter target value Xt exists as many as the number of parameter types, including a resolution target value Rt, a carrier level target value Ct, an asymmetry target value At, a modulation factor target value Mt, a signal level target value Lt and the like. The monitor parameter intercept Xi includes a resolution intercept Ri, a carrier level intercept Ci, an asymmetry intercept Ai, a modulation factor intercept Mi, a signal level intercept Li and the like.

In the above-described case of FIG. 3B, the OPC parameters to be used for the reproducing power adjustment are changed depending upon the type of a reproducing condition change. The optical disc apparatus stores therefore in advance correspondence information between an optical disc reproducing condition and OPC parameters corresponding to the reproducing condition, or the optical disc apparatus performs test reading corresponding to the reproducing condition to generate and store OPC parameters corresponding to the reproducing condition. The correspondence information between a reproducing condition and OPC parameters may be information in a table format which is called an OPC parameter table.

The OPC parameter table is generated by performing test reading in which reproducing is performed under each reproducing condition at a plurality of reproducing powers, by acquiring a monitor parameter and a bER at each reproducing power and using the relational characteristics between a reproducing power, a bER and a monitor parameter. For example, the lower limit value Pmin and upper limit value Pmax of the reproducing power range are determined by calculating reproducing powers P1 and P2 (P1<P2) providing predetermined bER values where Pmin=P1 and Pmax=P2. The recommended reproducing power Pt may be a reproducing power providing the minimum bER. The monitor parameter target value Xt is set to a resolution value at the recommended reproducing powers Pt. The monitor parameter intercept Xi is set to a resolution value at a reproducing power of 0 of a linear function approximating the relational characteristics between a resolution and a reproducing power near at the recommended reproducing power Pt.

The OPC parameter table is stored in a predetermined area, e.g., a management information area of an optical disc or in a predetermined storage unit in an optical disc apparatus. When reproducing starts, the optical disc apparatus reads this information and stores the read information in a predetermined storage unit of the optical disc apparatus, to use the information necessary for performing reproducing power adjustment. If an optical disc or an optical disc apparatus does not have the OPC parameter table, the optical disc apparatus generates the OPC parameter table by test reading when reproducing starts. For a reproducing power and OPC parameters to be used for performing reproducing power adjustment at the start of reproducing, OPC parameter values under a reproducing condition at the start of reproducing, stored in the OPC parameter table acquired from an optical disc or optical disc apparatus or in the OPC parameter table generated by the optical disc apparatus, are set as initial values at the start of reproducing.

By providing the above-described monitor parameter observing unit, it becomes possible for the optical disc apparatus of each embodiment to realize a function of detecting a change in a reproducing condition of a drive and a function of sensing a variation in a thermal efficiency of energy radiated to an optical disc and in a heat quantity absorbed in a super-resolution film. By providing a unit for calculating an optimum value of a reproducing power after a reproducing condition change by using a monitor parameter detection value and OPC parameters and a unit for controlling a laser power in accordance with the calculation result, it becomes possible for the optical disc apparatus of each embodiment to realize a function of dynamically changing a reproducing power, a function of calculating a compensation quantity of energy or power to be radiated to an optical disc in accordance with a change quantity of an index and a function of controlling energy or power in accordance with the compensation quantity. By providing a unit of changing OPC parameters in accordance with a reproducing condition, optimum reproducing is able to be realized always.

The above-described reproducing power adjustment may be performed in accordance with evaluation results of the monitor parameter acquired always during reproducing. For example, if a difference between the acquired monitor parameter and the monitor parameter target value is larger than a predetermined value, it is judged that reproducing power adjustment is necessary and the adjustment is performed.

Generating OPC parameters through test reading may be executed in accordance with evaluation results of reproduced signals. For example, if a bER of reproduced signals is a reproducing limit value of $bER=1\times10^{-5}$ or higher, it is judged that it is necessary to generate OPC parameters, and OPC parameters are generated through test reading. If correspondence between a reproducing condition and OPC parameters is incorrect, an optimum parameter for the reproducing condition is therefore able to be given and optimum reproducing is realized.

Generating OPC parameters through test reading may be executed in accordance with an estimated change in the reproducing condition. For example, if it is known that in continuous reproducing of addresses A and B, OPC parameters for the address B are not held, it is judged immediately after moving to the reproducing position for the address B, that it is necessary to generate the OPC parameters and the OPC parameters are generated through test reading. It is therefore possible to realize optimum reproducing even under a reproducing condition with unknown OPC parameters.

The OPC parameter table may be stored in either an optical disc apparatus or an optical disc. For example, at the end of reproducing, the OPC parameter table stored in an information storage unit of an optical disc apparatus is stored in a different storage unit of the optical disc apparatus or in a management area of the optical disc. When the same disc is reproduced thereafter, it is not necessary to generate again the OPC parameters under the previous reproducing condition so that a time taken to generate OPC parameters is able to be shortened. Information to be held in an optical disc apparatus or optical disc may include information identifying the optical disc in addition to the OPC parameter table.

The reproducing power adjusting method in super-resolution reproducing is also applicable to high density techniques using evanescent light. According to the high density techniques, an objective lens called a solid immersion lens (SIL) and having NA=1 or larger is used to generate evanescent light, a pit having a smaller size is detected by using a small spot size of evanescent light. If a distance between an objective lens and a medium is as short as several tens nm, evanescent light propagates in the medium. The distance between SIL and a medium is therefore precisely controlled by focus servo techniques called gap servo. A recording medium used in combination with SIL is called a SIL medium. The above-described reproducing power adjusting method is able to realize optimum reproducing even for a SIL medium having a super-resolution film.

Since the method called gap servo is used as focus servo during reproducing a SIL medium, it is known that reproduced signals are degraded due to a thickness variation of a cover layer of the SIL medium. The gap servo controls a distance between the objective lens and a medium surface to become constant. As a thickness of the cover layer changes, a spot on a data layer takes a defocused state and a signal amplitude changes to degrade reproduced signals. Reproduced signals of a multilayer SIL medium are degraded thither because a thickness change in an intermediate film between layers adversely affects. It is possible to adjust a signal amplitude by a reproducing power for a SIL medium having a super-resolution film on a data layer. In reproducing a SIL medium having a super-resolution film, it is possible to make constant a signal amplitude and suppress deterioration of reproduced signals by executing reproducing power adjustment.

With the above-described reproducing power adjustment, an optical disc apparatus is able to realize stable super-resolution reproducing of user information recorded in an optical disc to obtain user information.

Next, embodiments of the invention will be described with reference to the accompanying drawings. Each embodiment is only an example of the embodiment reducing the present invention in practice, and it is obvious that the invention is not limited to the embodiments.

[First Embodiment]

An example of the structure of an optical disc apparatus of the embodiment will be described in which an asymmetry value is used as a monitor parameter, and readjustment of a reproducing power is performed so as to make a monitor parameter observed during a reproducing operation have a target value. OPC parameters used for performing reproducing power adjustment change with a reproducing condition. It is assumed that the reproducing condition of the embodiment is determined by using as indices a reproducing layer, a reproducing position, a reproducing linear velocity and an environment temperature. The conditions derived from the structure of a medium such as a medium sensitivity and a super-resolution film material under each reproducing condition are all contained in the medium reproducing layer and reproducing position.

Figures 4, 5:
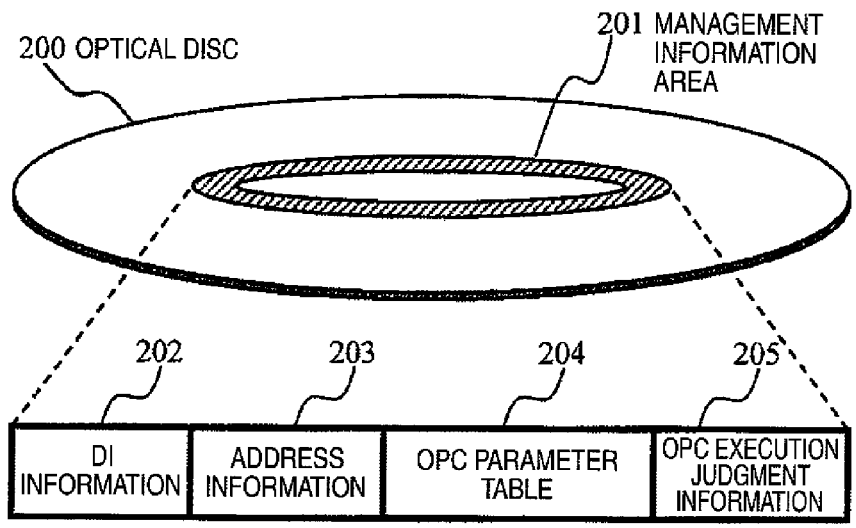
FIG. 4 is a diagram illustrating an example of the structure of a management information area of an optical disc.
FIG. 5 is a diagram illustrating an example of an OPC parameter table in which OPC parameters are tabled in correspondence with the reproducing conditions.

In this embodiment, an optical disc is used having two data layers. Of the two data layers, a layer on a front side as viewed from a light incidence side is called an L1 layer and a layer on a bottom side is called an L0 layer. Management information of an optical disc is recorded in a management information area of the L0 layer, and user information is recorded in user information areas of the L0 and L1 layers. A track pitch of each of the management information area and user information area is 320 nm, a signal is recorded by 1-7 modulation, and the shortest pit length in the management information area is 150 nm whereas the shortest pit length of the user information area is 50 nm. At least the shortest pit of signals in the user information area is therefore smaller than an optical resolution relative to a laser beam having a wavelength of 405 nm and an objective lens having a numerical aperture of 0.85 presently used by the BD type optical system of conventional optical disc techniques, and super-resolution reproducing is required. On the other hand, since the shortest pit in the management information area has a size of an optical resolution or larger, normal resolution reproducing is possible. Since address information is recorded by wobble signals in the whole area of an optical disc, a seek operation to a target reproducing position is able to be executed by normal resolution reproducing. As illustrated in a schematic diagram of FIG. 4, the management information in the L0 layer is constituted of disc information (DI) 202, address information 203, an OPC parameter table 204 and OPC execution judgment information 205. The DI information 202 is fundamental information specific to a medium such as a type of an optical disc and a reproducing power for normal resolution reproducing. The address information 203 is information indicating the position of each area of the optical disc where information is recorded. The OPC parameter table 204 stores information on OPC parameters corresponding to the reproducing conditions, an example of which is illustrated in FIG. 5. The OPC parameter table of the optical disc defines twelve (n) reproducing conditions corresponding to a reproducing layer, a reproducing radius, a reproducing linear velocity and a temperature, and sets OPC parameter values to be used under each reproducing condition. This reproducing condition classification corresponds to a reproducing condition change illustrated in FIG. 3B, and the index n of the reproducing condition corresponds to n of the equation (5). The OPC parameters of this embodiment include a recommended reproducing power Pt, a reproducing power lower limit value Pmin, a reproducing power upper limit value Pmax, an asymmetry target value At and an asymmetry intercept Ai. In FIG. 5, there are reproducing conditions whose OPC parameters are not set. Although it is estimated that these reproducing conditions have different OPC parameter values from those of the other reproducing conditions, the OPC parameter values are presently unknown. The OPC execution judgment information 205 of the management information includes information such as an asymmetry error threshold value ΔAth which is a monitor parameter error threshold value ΔXth and a bER threshold value or jitter threshold value Jth to be used for judging whether OPC parameters are generated by test reading. The details of the OPC execution judgment information will be described in the embodiment. Although the OPC parameter table and OPC execution judgment information are described separately from the DI information in this embodiment, the table and information may be described collectively in the DI information.

Figure 6:
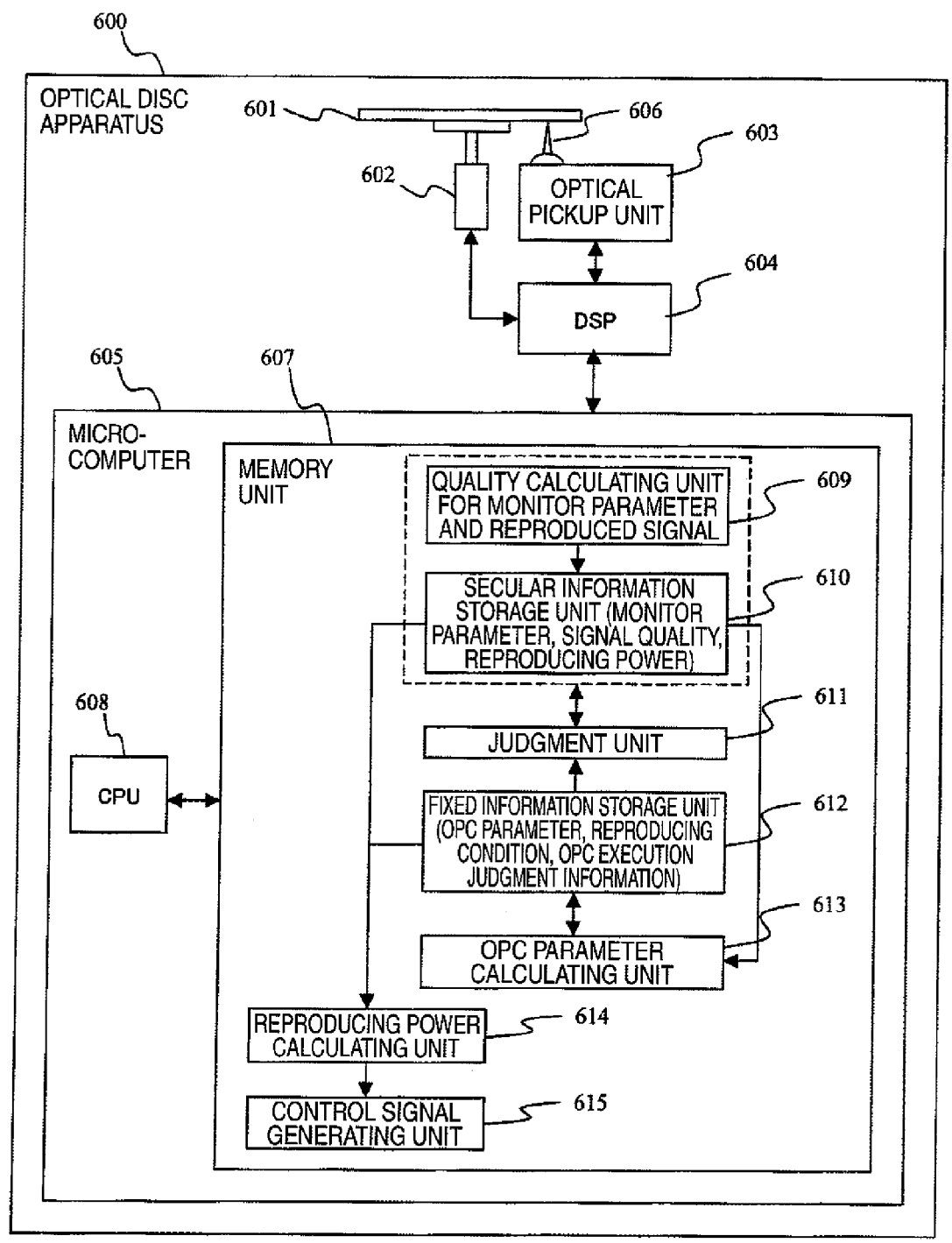
FIG. 6 is a diagram illustrating an example of the main structure of an optical disc apparatus.

FIG. 6 illustrates an example of the structure of the optical disc apparatus of the embodiment. The optical disc apparatus 600 of this embodiment is constituted of a spindle motor 602 constituting a disc rotating unit for holding an optical disc 601 and rotating the disc, an optical pickup unit 603 for reading/writing information relative to the optical disc 601, a digital signal processor 604 (DSP) as a control unit for collectively controlling the whole optical disc apparatus, a microcomputer 605 and the like. The optical disc 601 is subjected to constant linear velocity (CLV) control or constant angle velocity (CAV) control by the spindle motor 602. The optical pickup unit 606 is disposed facing the optical disc 601, radiates a laser beam 606 emitted from a laser diode (LD) (not shown) to an information recording layer via an objective lens (not shown) to perform recording/reproducing of the optical disc. LD disposed in the optical pickup unit 603 illustrated in FIG. 6 has a wavelength of 405 nm, and NA of an objective lens disposed in an optical system of the optical pickup unit 603 is 0.85. The structure of the optical pickup unit is therefore almost equal to that of the BD optical pickup unit of conventional optical disc techniques. Although not shown, actuators for spherical aberration correction, focus servo and tracking servo are disposed in the optical pickup unit 603, and driven in accordance with control signals from DSP 604. A temperature sensor (not shown) is disposed in the optical pickup unit to detect an environment temperature.

DSP 604 is usually made of an LSI and has functions of an LD drive (LDD), a record data encoder, a reproduced signal decoder, servo control for the optical pickup unit 603, a rotation control of the spindle motor 602, information storage and the like. From this reason, DSP 604 is also called a control unit. The microcomputer 605 has a central processing unit (CPU) 608 for evaluating and processing signals such as reproduced signals and servo signals acquired from DSP 604 and a storage unit (memory unit) 607. A reproducing power, a recording power and signals regarding the servo actuators generated in accordance with the evaluation are fed back to DSP 604. The details of software stored in the memory unit will be later described. In FIG. 6, although the control unit is constituted of discrete DSP 604 and microcomputer 605, these components may be formed on one chip of the same LSI. In the microcomputer 605, CPU 608 executes programs stored in the memory 607 to realize functional blocks illustrated in FIG. 6. Although these functional blocks being illustrated in FIG. 6 being developed in the memory 607, these blocks are realized actually by a cooperation of CPU and memory. In this embodiment, the microcomputer 605 includes: a quality calculating unit 609 for calculating the qualities of a monitor parameter and a reproduced signal; a secular information storage unit 610 for storing the calculated qualities of a monitor parameter and a reproduced signal; an OPC parameter calculating unit 613 for calculating OPC parameters by using the qualities of a monitor parameter and a reproduced signal; a fixed information storage unit 612 for storing OPC parameters, a reproducing condition and OPC execution judgment information; a judgment unit 611 for judging whether reproducing power adjustment and OPC parameter generation are performed by using OPC execution judgment information, and the qualities of a monitor parameter and a reproduced signal; a reproducing power calculating unit 614 for calculating an optimum reproducing power by using a monitor parameter and OPC parameters; a control signal generating unit 615 for converting a calculated optimum reproducing power into a control signal for DSP 604; and the like. The secular information storage unit 610 stores also a reproducing power and a reproducing condition supplied from DSP 604 via a signal path (not shown).

Signals of the optical disc 601 are reproduced by radiating a laser beam 606 at a reproducing power from LD in the optical pickup unit 603. Reproduced signals output from the optical pickup unit 603 are supplied to DSP 604, decoded by a reproduced signal processing unit and a decoder in DSP 604, and output as reproduced data. In this case, DSP 604 generates a focus error signal and a tracking error signal in accordance with a signal supplied from the optical pickup unit 603, and supplies the error signals to the actuators for focus servo and tracking servo in the optical pickup unit 603 to control focus servo and tracking servo. A reproducing optical system including a lens tilt actuator and a spherical aberration correction actuator is also controlled by DSP 604 in accordance with signals from the optical pickup unit 603. A reproducing power in the optical pickup unit 603 is controlled by DSP 604, and a reproducing power is determined by DSP 604 in accordance with signals from the microcomputer 605.

Signals are recorded in the optical disc 601 by encoding record data by an encoder in DSP 604 to generate record signals, generating LDD drive signals in accordance with the record signals, and supplying the LDD drive signals to LD in the optical pickup unit 603. If it is necessary to initialize a disc film by laser radiation prior to recording/reproducing the optical disc 601, the laser beam 606 at an initializing power is radiated from LD. If the optical disc 601 is a rewritable medium, the laser beam 606 is radiated from LD at an erase power of changing the area of the optical disc 601 in which data was already recorded to a non-record state.

Figure 7:
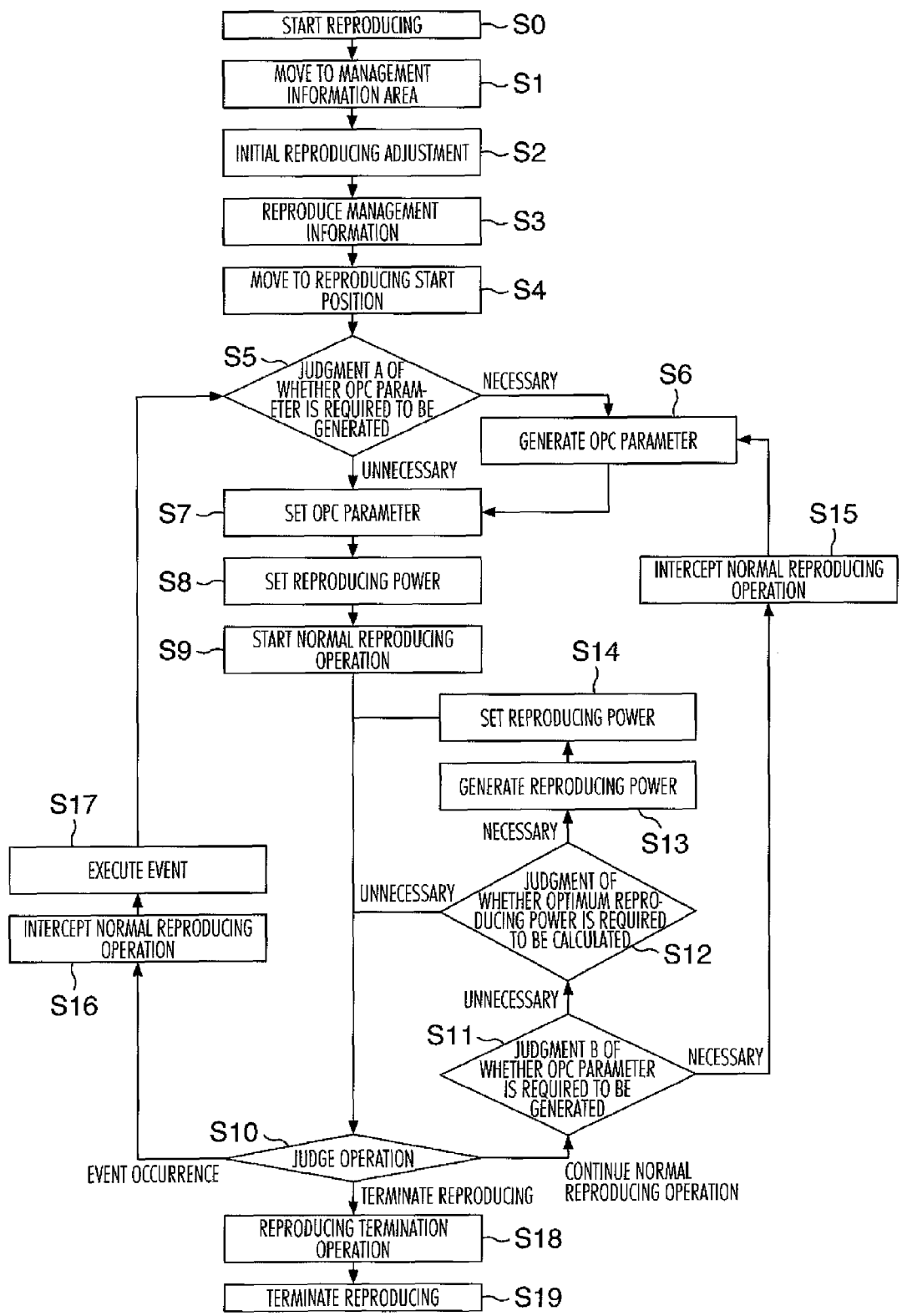
FIG. 7 is a flow chart illustrating an example of a series of reproducing operations including an operation of reproducing power adjustment.

Next, with reference to the flow chart of FIG. 7, description will be made on a reproducing operation of the optical disc illustrated in FIG. 4 using the optical disc apparatus illustrated in FIG. 6. FIG. 7 illustrates an example of the sequence of a reproducing operation including reproducing adjustment, and illustrates only main items. The following control sequence is executed by the microcomputer 605 unless otherwise specifically noted.

As an optical disc is set to an optical disc apparatus and a reproducing operation starts (S0), the optical disc apparatus rotates the optical disc at a constant linear velocity (CLV) of 4.92 m/s and radiates a reproducing laser beam at a power of 0.3 mW to a management information area (S1). Similar to reproducing adjustment of conventional optical disc techniques, reproducing adjustment such as spherical aberration, focus, tracking, and tilt is performed (S2), and thereafter the management information area is reproduced (S3) to acquire management information including DI information 202, address information 203, an OPC parameter table 204, and OPC execution judgment information 205. All the acquired information is stored in the fixed information storage unit 612. The acquired address information contains addresses 1 and 2 indicating the positions of the user areas to be reproduced in this embodiment. The acquired OPC execution judgment information contains an asymmetry error threshold value ΔAth and a bER threshold value bth=$1\times10^{-5}$.

The reproducing laser beam moves to the address 1 of the user information area from which reproducing starts (S4) to execute judgment A whether OPC parameters are required to be generated (S5). In this case, the judgment unit 611 judges whether OPC parameters are required to be generated. More specifically, the judgment unit 611 compares the OPC parameter table supplied from the fixed information storage unit 612 with the present reproducing condition supplied from the secular information storage nit 610, and if there exists the OPC parameters under the present reproducing condition, it is judged that the OPC parameters are not required to be generated, whereas if there does not exist, it is judged that the OPC parameters are required to be generated. The present reproducing conditions are the L0 layer, a radius of 30 mm, a linear velocity of 4.92 m/s and an environment temperature of 25° C., which correspond to the reproducing condition 2 (n=2). Since there exists the OPC parameters under this reproducing condition, judgment A determines that the OPC parameters are not required to be generated (S5).

At the next Step S7, the OPC parameters (Pt(2), Pmin(2), Pmax(2), Xt(2) and Xi(2)) of the reproducing condition 2 are set as the OPC parameters to be presently used, and the recommended reproducing power Pt(2) of the OPC parameters is set to the reproducing power (S8) to thereafter start a normal reproducing operation (S9). At Step S8, a reproducing power calculated by the reproducing power calculating unit 614 is transferred to the optical pickup unit 603 via the control signal generating unit 615 and DSP 604 to be set as a radiation power of LD.

At each sequence during the reproducing operation, a reproducing power is represented by P(n, m), a monitor power is represented by X(n, m+1), an optimum reproducing power changed by reproducing power adjustment is represented by P(n, m+1), a recommended reproducing power, a reproducing power lower limit value, an upper limit value, a monitor parameter target value and a monitor parameter intercept of the OPC parameters are represented by Pt(n), Pmin(n), Pmax(n), Xt(n) and Xi(n), respectively, in accordance with the equation (5). 0 is set to m at the reproducing start, and a statement of m'=m+1 is given. Therefore, m at each sequence corresponds to the number of execution times of Step S13 for calculating an optimum reproducing power, and is an index indicating how many times the reproducing condition illustrated in FIG. 3A occurred.

Since branches in the flow of Step S10 and following Steps are complicated, description will be made by dividing the flow into several patterns.

Pattern 1 (without Reproducing Power Adjustment, Usual Normal Reproducing Operation)

First, an operation judgment is performed at Step S10. In this case, the judgment unit 611 judges an operation to be performed next. More specifically, the judgment unit 611 judges from information supplied from DSP 604 via a path (not shown in FIG. 6) whether the normal reproducing operation is to be continued, an event is to be executed, or reproducing is terminated. As illustrated at Step S10 in FIG. 7, Step to follow changes with each of these patterns. The event is any of various operations executed by the drive itself, excepting normal reproducing continuation and reproducing termination, e.g., changing a reproducing linear velocity and changing a reproducing position. The reproducing condition of a drive may change due to various reasons. These reasons of changing the reproducing condition may be an external environment of the drive or a control operation of the drive itself. The drive is unable to estimate the former so that it is judged at Step S10 that the normal reproducing operation is to be continued. In the latter case, the drive is able to estimate the next reproducing condition. Therefore, in the flow illustrated in FIG. 7, when an event occurs, the flow transits to an event execution flow to set at Step S5 the OPC parameters under the reproducing condition after execution of the event. Although it is considered that the drive itself determines an event occurrence at any time during execution of the normal reproducing operation, a strict occurrence position is not an important issue, but it is important that the microcomputer 605 recognizes at the timing of S10 whether there exists an event estimated to occur. Since the operation to follow is continuation of the normal reproducing operation, the flow advances from Step S10 to Step S11.

Step S11 performs judgment B of whether OPC parameters are required to be generated. In this case, the judgment unit 611 judges whether the OPC parameters are required to be generated by test reading. More specifically, the quality calculating unit 609 for calculating the qualities of a monitor parameter and a reproduced signal calculates a present bER by using reproduced signals transferred from DSP 406, and transmits the calculated present bER to the secular information storage unit 610 to be stored therein. The judgment unit 611 compares the present bER transmitted via the secular information storage unit 610 with the bER threshold value bth of the OPC execution judgment information transmitted from the fixed information storage unit 612. It is judged that the OPC parameters are not required to be generated if the present bER is bth or smaller, and that the OPC parameters are required to be generated if the present bER is larger than bth. Since bER calculated at Step S11 is $3\times10^{-7}$ smaller than bth=$1\times10^{-5}$, it is judged that the OPC parameters are not required to be generated to thereafter advance to Step S12.

At the next Step S12 it is judged whether an optimum reproducing power is required to be calculated. In this case, the judgment unit 611 judges whether an optimum reproducing power is required to be calculated. More specifically, the quality calculating unit 609 for calculating the qualities of a monitor parameter and a reproduced signal calculates a present monitor parameter value X by using signals transmitted from DSP 406, and transmits the calculated present monitor parameter value X to the secular information storage unit 610 to be stored therein. By using the present monitor parameter value X transmitted via the secular information storage unit 610, a monitor parameter target value Xt of the OPC parameters transmitted from the fixed information storage unit 612 and a monitor parameter error threshold value ΔXth of the OPC execution judgment information, the judgment unit 611 judges that an optimum reproducing power is not required to be calculated, if a difference between the monitor parameter value X and monitor parameter target value Xt is the monitor parameter error threshold value ΔXth or smaller, and that an optimum reproducing power is required to be calculated if the difference is larger than the threshold value. An asymmetry value A(2,1) of the monitor parameter calculated at Step S12 is 0% and a difference from an asymmetry target value At(2)=0% is smaller than the asymmetry error threshold value ΔAth=0.5%. It is therefore judged that an optimum reproducing power is not required to be calculated.

The flow returns to Step S10 whereat the normal reproducing operation is to be continued so that the following operation is a repetition of Steps S10, S11 and S12. As the reproducing continues, the flow will not move out of the loop of Steps S10 to S12, and a bER of reproduced signals is good at $5×10^{-7}$. It is therefore able to confirm that optimum reproducing is realized in accordance of the flow illustrated in FIG. 7.

During the normal reproducing operation, Steps S10, S11 and S12 are always executed repetitively. This repetition corresponds to continuously checking the type of an estimated operation, necessity of OPC parameter generation and necessity of setting again an optimum reproducing power. Namely, if an event occurrence is estimated, the flow advances to Step S16 to execute an event and change the OPC parameters under the reproducing condition, if reproducing termination is estimated, the flow advances to Step S19 to terminate reproducing, if an optimum reproducing power is not properly calculated and a bER becomes larger than bth, the flow advances to Step S15 to generate the OPC parameters corresponding to the present reproducing condition, and if a reproducing power shifts from the optimum reproducing power and the monitor parameter shifts from the target value, the flow advances to Step S13 to change the reproducing power to the optimum reproducing power.

Pattern 2 (with Reproducing Power Adjustment, without OPC Parameter Change)

Next, description will be made on a control flow when it is judged at Step S12 that an optimum reproducing power is not required to be calculated. For example, the flow advances to Step S13 if a present asymmetry value A(2, 1) calculated at Step S12 is −3.6% and an error of 3.6% from an asymmetry target value At(2)=0% is larger than the asymmetry error threshold value ΔAth=0.5%.

An optimum reproducing power is calculated at Step S13. More specifically, an optimum reproducing power P(2, 1) is calculated by transmitting to the reproducing power calculating unit 614 the present reproducing power P(2, 0) and asymmetry value A(2, 1) stored in the secular information storage unit 610 and the asymmetry target value At (2) and asymmetry intercept Ai (2) stored in the fixed information storage unit 612. The optimum reproducing power is calculated by the equation (5), and the calculated reproducing power is re-adjusted by using the reproducing power lower limit value Pmin(2) and reproducing power upper limit value Pmax(2). Re-adjustment is performed to prevent information in an optical disc from being broken by excessive reproducing power radiation when the calculated reproducing power is outside the range defined by the present OPC parameters. If Pmin(2)≦P(2, 1)≦Pmax(2) is satisfied, the value of (2, 1) itself is used, whereas if P(2, 1)<Pmin(2) or P(2, 1)>Pmax(2), the values are changed to P(2,1)=Pmin and P(2,1)=Pmax, respectively. The present reproducing power P(2,0) is 2.0 mW, an asymmetry value A(2,1) is −3.6%, an asymmetry target value At(2) is 0%, and an asymmetry intercept Ai(2) is −40%. The optimum reproducing power P(2,1) calculated from the equation (5) is therefore 2.2 mW which is in the range from the reproducing power lower limit value Pmin(2)=1.2 mW to the upper limit value Pmax(2)=4.0 mW. The optimum reproducing power P(2, 1) determined at Step S13 is therefore 2.2 mW.

At the next Step S14, the value of the determined optimum power is set to a present reproducing power to continue the reproducing operation. The succeeding operation is repetition of Steps S10 to S12. The values of a bER and asymmetry calculated at Steps S11 and S12 are always 1 to $4×10^{-7}$ and −0.1 to 0.2%, respectively. It is therefore confirmed that optimum reproducing is realized by changing the reproducing power at Step S13.

This case deals with the reproducing condition change illustrated in FIG. 3A. It is confirmed that correct reproducing power adjustment is able to be executed automatically for the reproducing condition change.

Pattern 3 (with OPC Parameter Change, without Reproducing Power Adjustment)

Next, description will be made on a control flow when it is judged at Step S10 that an event is required to be executed. This pattern corresponds to the case wherein it is assumed that a reproducing position is changed from an address 1 to an address 2 (address jump) during the normal reproducing operation. After the address 1 is reproduced, the flow branches from Step S10 to Step S16. The address 2 is near at a radius of 20 mm of the L1 layer of an optical disc.

At Step S16 the normal reproducing operation is intercepted, and at Step S17 address jump to the address 2 is executed. At the next Step S5, it is judged as described earlier whether the OPC parameters under the present reproducing condition exists in the OPC parameter table stored in the fixed information storage unit 612. The present reproducing condition corresponds to the reproducing condition 8 of the OPC parameter table in FIG. 5 so that the OPC parameters exist. The OPC parameters are therefore not required to be generated. At the next Step S7, the OPC parameters of the reproducing condition 8 are set as present OPC parameters. At Step S8 the recommended reproducing power Pt(8) is set as a reproducing power, and at Step S9 the normal reproducing operation starts.

The following operation is repetition of Steps S10 to S12. A value of a bER calculated at Step S11 is always 5 to $8×10^{-7}$ smaller than the bER threshold value bth=$1×10^{-5}$, and a difference between an asymmetry value A(8, 2) calculated at Step S12 and an asymmetry target value At(8) is always 0.3% or smaller which is smaller than the asymmetry error threshold value ΔAth=0.5%. It is therefore confirmed that optimum reproducing is realized by changing the OPC parameters when the reproducing condition changes.

This case deals with the reproducing condition change illustrated in FIG. 3B. It is confirmed that correct reproducing power adjustment is able to be executed automatically for the reproducing condition change. In this embodiment, since there exists the OPC parameter table, a difference of the reproducing condition is able to be judged. For a change to the reproducing condition having OPC parameters, an operation from normal reproducing interception to resumption is able to be executed in a short time.

Pattern 4 (Change in an OPC Parameter, Required to Generate OPC Parameters, without Reproducing Power Adjustment)

Next, description will be made on a control flow when it is judged at Step S10 that an event is required to be executed and there exists no OPC parameters under the reproducing condition after event execution. For example, it is assumed that a reproducing linear velocity is changed from 4.92 m/s to a ten-fold velocity of 49.2 m/s during the normal reproducing operation at the address 2, and the flow advances from Step S10 to Step S16.

The normal reproducing operation is intercepted at Step S16, and a linear velocity is changed to 49.2 m/s at Step S17. At the next Step S5 it is judged whether the OPC parameters under the present reproducing condition exist in the OPC parameter table. The present reproducing condition corresponds to the reproducing condition 12 in the OPC parameter table in FIG. 5, and the OPC parameters do not exist. It is therefore required to generate OPC parameters and the flow advances to Step S6.

OPC parameter generation is executed at Step S6 to generate the OPC parameters under the present reproducing condition. More specifically, the optical disc apparatus performs reproducing (test reading) by using a plurality of reproducing powers, the quality calculating unit 609 calculates the qualities (values of an asymmetry and bER) of a monitor parameter and a reproduced signal by using reproduced signals at each reproducing power transmitted from DSP 604, and the calculated results in correspondence with each reproducing power are transmitted to the OPC parameter generating unit 613 via the secular information storage unit 610. In this case, the bER threshold value bth stored in the fixed information storage unit 612 is also transmitted to the OPC parameter calculating unit 613. In accordance with the supplied information, the OPC parameter calculating unit 613 calculates a reproducing power upper limit value Pmax(12), a lower limit value Pmin (12), a recommended reproducing power Pt(12), a monitor parameter target value At(12) and a monitor parameter intercept Ai(12), and transmits the calculated results to the fixed information storage unit 612. In this manner, overwritten are the OPC parameters under the reproducing condition 12 of the OPC parameter table stored in the fixed information storage unit 612. The OPC parameters exist therefore. In this case, the reproducing power lower limit value Pmin(12) is set to P1 in accordance with the calculation rule that in the relational characteristics between a reproducing power and bER, P1 of the reproducing powers P1 and P2 (P1<P2) is used at which P1, bER is coincident with the bER threshold value bth. The reproducing power upper limit value Pmax(12) is set to P2 in accordance with the calculation rule. The recommended reproducing power Pt(12) is set to the reproducing power providing the lowest bER in accordance with the calculation rule. The asymmetry target value At(12) is set to an asymmetry value at the recommended reproducing power Pt(12) in the relational characteristics between a reproducing power and asymmetry value, in accordance with the calculation rule. The asymmetry intercept Ai(12) is set in accordance with the calculation rule that the relational characteristics between a reproducing power and asymmetry value in Pmin (12)$\leq$P$\leq$Pmax(12) are approximated to a straight line, and the asymmetry value at a reproducing power of 0 is used. All these calculation rules are also stored in the fixed information storage unit 612, and the OPC parameter calculating unit 613 performs various calculations by referring to the calculation rules.

The OPC parameters calculated in the above manner include a reproducing power lower limit value Pmin(12) of 1.5 mW, an upper limit value Pmax(12) of 4.6 mw, a recommended reproducing power Pt(12) of 3.0 mW, an asymmetry target value At(12) of 1.7% and an asymmetry intercept Ai(12) of −50.7%. These calculation results are overwritten as the OPC parameters under the reproducing condition 12 of the OPC parameter table in the fixed information storage unit 612.

At the next Step S7, the OPC parameters under the present reproducing condition 12 are set to be used presently. The recommended reproducing power Pt(12) is set to a reproducing power at Step S8, and the normal reproducing operation starts at Step S9.

The following operation is repetition of Steps S10 to S12. A value of a bER calculated at Step S11 is always 4 to $9\times10^{-7}$ smaller than the bER threshold value bth=$1\times10^{-5}$, and a difference between an asymmetry value A(12, 2) calculated at Step S12 and an asymmetry target value At(12) is always 0.2% or smaller which is smaller than the asymmetry error threshold value $\Delta$Ath=0.5%. It is therefore confirmed that optimum reproducing is realized by generating and using the OPC parameters under the reproducing condition 12.

This case performs the reproducing power adjustment by using the flow in FIG. 7. It is confirmed that the optical disc apparatus estimates a change in the reproducing condition illustrate in FIG. 3B, automatically performs reproducing power adjustment in response to the change in the reproducing condition and realizes optimum reproducing.

Pattern 5 (Reproducing Power Adjustment Failure, OPC Parameter Generation)

Next, description will be made on a control flow when it is judged at Step S11 that OPC parameters are required to be generated. For example, if a present bER calculated at Step S11 is $3\times10^{-5}$ larger than a bER threshold value bth=$1\times10^{-5}$, the flow advances to Step S15.

After the normal reproducing operation is intercepted at Step S15, generation of OPC parameters under the present reproducing condition starts at Step S6. The OPC parameters under the present reproducing condition 12 are already given and set as OPC parameters to be used presently. OPC parameters are generated irrespective of already existing OPC parameters because the present reproducing condition is different from the reproducing condition 12. The reproducing condition 12 is therefore divided into a range able to use the OPC parameters under the present reproducing condition 12 and a range unable to use the OPC parameters under the present reproducing condition 12. A reproducing condition able to use the OPC parameters under the present reproducing condition 12 is called a reproducing condition 12-1, and a reproducing condition unable to use the OPC parameters is called a reproducing condition 12-2 whose OPC parameters are required to be generated. While the optical disc is reproduced from the radius of 20 mm sequentially toward the outer circumference, it is judged in this case at a radius of 45 mm that OPC parameters are required to be generated. The reproducing condition 12-2 is therefore a reproducing condition for the range from a radius of 45 mm of the reproducing condition 12 toward the outer circumference. Similar to the above-described Pattern 4, OPC parameters are generated at Step S6 including a reproducing power lower limit value Pmin(12-1) of 2.2 mw, an upper limit value Pmax(12-2), a recommended reproducing power Pt(12-2) of 3.6 mW, an asymmetry target value At(12-2) of 0% and an asymmetry intercept Ai(12-2) of −63%. The calculated OPC parameters are stored in the fixed information storage unit 612.

At Step S7, the OPC parameters under the reproducing condition 12-2 are set as OPC parameters to be used presently. At Step S8, the recommended reproducing power Pt(12-2) is set to a reproducing power, and the normal reproducing operation starts at Step S9. The following operation is repetition of Steps S10 to S12, and it is confirmed that reproducing to a radius of 55 mm is possible by using the generated OPC parameters. The values of bER and asymmetry calculated at Steps S11 and S12 are always 4 to $8\times10^{-7}$ and −0.2 to 0.4%, and it is confirmed that optimum reproducing is realized by changing the OPC parameters at Step S13.

In Pattern 4, the OPC parameters under the reproducing condition 12 are generated, and in Pattern 5 the reproducing condition 12 is divided into two reproducing conditions 12-1 and 12-2 to generate the OPC parameters. These generated results are all stored in the fixed information storage unit 612. For example, as illustrated in FIG. 8, the presently stored OPC parameter table has the reproducing condition and the reproducing condition having OPC parameters, more than those in FIG. 5. Since the optical disc apparatus stores a new reproducing condition and new OPC parameters, the same reproducing condition is used later to realize optimum reproducing.

Next, description will be made on the reproducing results after the reproducing power adjustment associated with the above-described OPC parameter generation and change.

Figure 9:
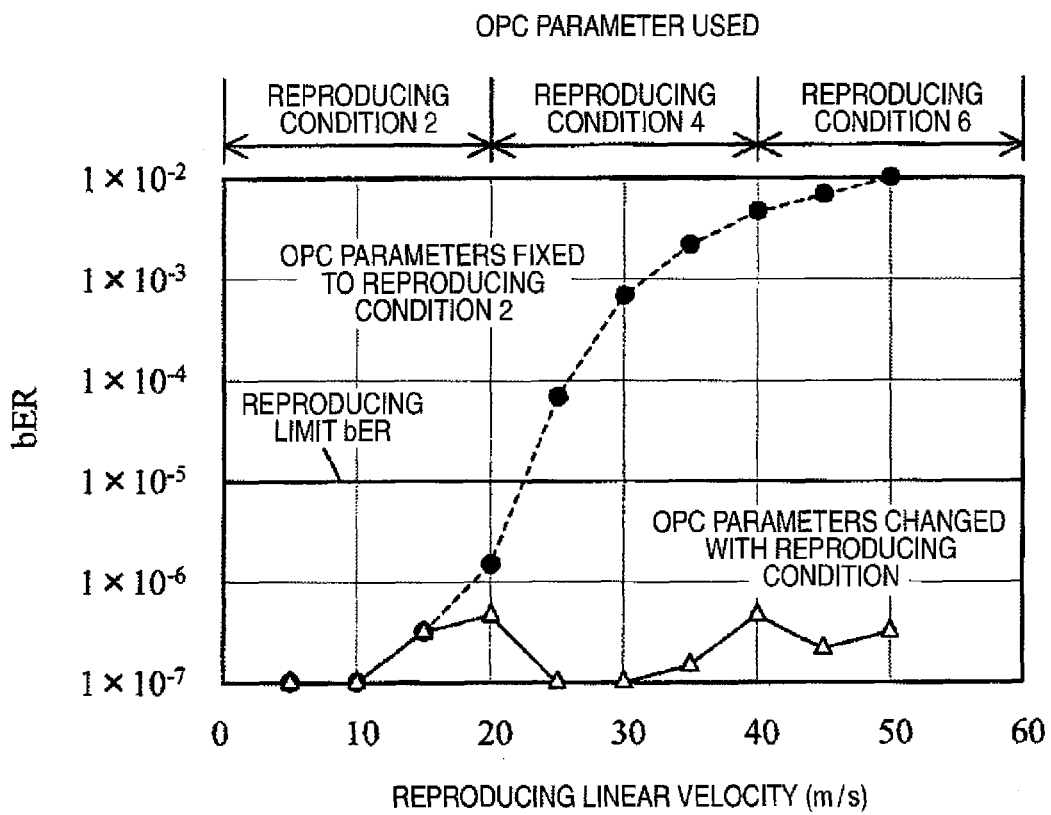
FIG. 9 is a graph illustrating a relation between a reproducing linear velocity and a bit error ratio (bER) of reproduced signals wherein in super-resolution reproducing of an optical disc, a reproducing power is adjusted by fixing OPC parameters, and by changing OPC parameters in accordance with the reproducing condition.

The reproduction results of the whole L0 layer under the reproducing conditions 2, 4 and 6 will be described. Measurement is performed by changing a reproducing position to the L0 layer and reproducing the whole L0 layer at each reproducing linear velocity. An environment temperature is 25° C. FIG. 9 illustrates the measurement results of a bER of reproduced signals in accordance with the flow of FIG. 7. The measurement results are also illustrated using reproducing power adjustment providing an asymmetry value equal to the asymmetry target value under the reproducing condition 2. With the reproducing power adjustment with a fixed asymmetry target value, a bER exceeds the reproduction limit bER at a reproducing linear velocity, and optimum reproducing is not realized. If reproducing power adjustment is performed by changing an asymmetry target value in accordance with the flow of FIG. 7, it is seen that optimum reproducing is realized setting always a bER lower than $1 \times 10^{-6}$.

Figure 10:
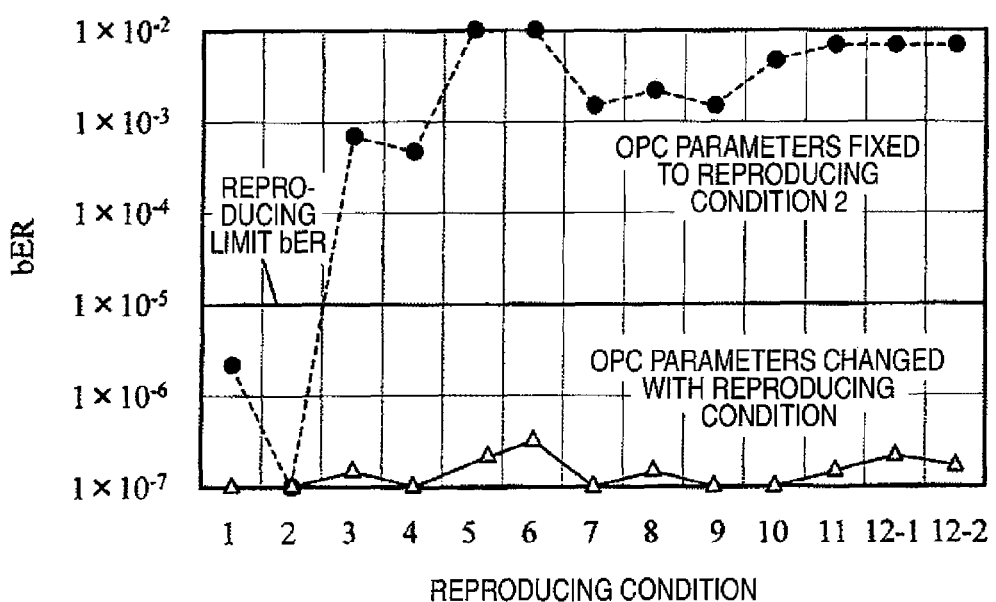
FIG. 10 is a graph illustrating a relation between the reproducing condition and a bER of reproduced signals wherein in super-resolution reproducing of an optical disc, a reproducing power is adjusted by fixing OPC parameters, and by changing OPC parameters in accordance with the reproducing condition.

Next, FIG. 10 illustrates measurement results of a bER of signals reproduced after reproducing power adjustment in accordance with the flow of FIG. 7 under the reproducing conditions of FIG. 5 and under the reproducing conditions 12-1 and 12-2 generated in Patterns 4 and 5. For the purposes of comparison, FIG. 10 illustrates also reproducing power adjustment with the asymmetry target value fixed to the reproducing condition 2. Similar to FIG. 9, with the reproducing power adjustment with a fixed asymmetry target value, a bER exceeds the reproducing limit bER under the reproducing conditions other than the reproducing conditions 1 and 2. On the other hand, as reproducing power adjustment is performed by changing the asymmetry target value, it is confirmed that optimum reproducing is realized under all the reproducing conditions. It is seen therefore that in order to reproduce all user information of an optical disc, reproducing power adjustment is performed by changing OPC parameters.

As reproducing a predetermined reproducing area is completed, it is judged at Step S10 that reproducing termination is estimated, to thereafter advance to Step S18. In the reproducing termination operation at Step S18, first the OPC parameter table held presently by the optical disc apparatus is stored in a predetermined storage unit (in this embodiment, the fixed information storage unit 612) and also in the management information area 201 of the optical disc. The stored OPC parameter table is different from that acquired initially from the optical disc. Since the generated OPC parameter table is left, at the next time of reproducing, the management information 201 of the optical disc is read or management information stored in the optical disc apparatus is read. It is therefore unnecessary for generating OPC parameters under the present reproducing condition so that a time until the reproduction starts is able to be shortened. After Step S18, the flow advances to Step S19 whereat reproducing is terminated.

It is confirmed from the above-described embodiment that optimum reproducing is realized by performing a reproducing operation in super-resolution reproducing in accordance with the flow of FIG. 7 and reproduction power adjustment is performed by changing OPC parameters by referring to the OPC parameter table.

[Second Embodiment]

In the reproducing operation of the first embodiment, if a present bER exceeds the bER threshold value bth used as the OPC parameter generation judgment information at Step S11 of FIG. 7, it is judged that OPC parameters are required to be generated, and the flow advances to Step S15. The operation at Step S11 is not limited thereto.

For example, if it is judged successively k (k≧2) times at Step S11 that OPC parameters are required to be generated, the flow may advance to Step S15. Even if a bER is temporarily degraded by optical disc defects, it is not judged that OPC parameters are required to be generated, and the flow will advance erroneously to Step S15.

Although judgment is performed at Step S11 by using a bER, judgment may be performed by using a jitter level calculated from reproduced signals. In this case, judgment at Step S11 uses a present jitter level and a jitter threshold value Jth as OPC parameter generation judgment information. Similar to the bER, since a jitter level is a reproduced signal quality index, similar advantages to those of the first embodiment are obtained. Since the jitter level is able to be evaluated even for a shorter signal as compared to a bER, Step S11 is able to be executed faster by using a jitter level.

[Third Embodiment]

At Step S12 of FIG. 7 of the reproducing operation of the first embodiment, it is judged that an optimum reproducing power is required to be calculated, if a difference between a monitor parameter X and a monitor parameter target value XCt exceeds a monitor parameter error threshold value ΔXth, An operation at Step S12 is not limited thereto.

For example, if the monitor parameter error threshold value ΔXth is represented by a percentage from a target value, it may be judged that the optimum reproducing power is required to be calculated, if an absolute value of (X−Xt)/Xt calculated by using the monitor parameter X and monitor parameter target value Xt exceeds ΔXth.

[Fourth Embodiment]

At Step S6 of FIG. 7 of the reproducing operation of the first embodiment, although the recommended reproducing power Pt is calculated by using the reproducing power and bER, the operation method at Step S6 is not limited thereto.

For example, a reproducing power providing the minimum jitter level in the relational characteristics between a reproducing power and a jitter level may be used as the recommended reproducing power Pt.

[Fifth Embodiment]

At Step S6 of FIG. 7 of the reproducing operation of the first embodiment, although the reproducing power lower limit value Pmin and upper limit value Pmax are calculated by using the relational characteristics between a reproducing power and bER, the operation method at Step S6 is not limited thereto.

For example, the relational characteristics may be used between the reproducing power and a parameter changing with the state of a super-resolution spot such as a jitter level, a resolution, a carrier level, an asymmetry value, a modulation factor and a signal level. A parameter to be used for generating OPC parameters should be changed with a medium. This is because since the relational characteristics between a parameter and a reproducing power are determined by a medium, a parameter having a large change rate relative to a reproducing power should be used in order to correctly calculate OPC parameters.

[Sixth Embodiment]

In the first embodiment, an asymmetry value is used as the monitor parameter. The monitor parameter is not limited to the asymmetry value, but other indices reflecting the state of a super-resolution spot may be used. For example, the index may be a resolution, a carrier level, a modulation factor, a signal level, an environment temperature or the like. In this case, an OPC parameter table exists for each of these monitor parameters, and similar advantages to those of the first embodiment are obtained by using each OPC parameter table.

However, if a change rate of a monitor parameter relative to a reproducing power is small, an erroneous optimum reproducing power may be calculated because of a detection error of an optical disc apparatus. A monitor parameter having a large change rate relative to a reproducing power is selected in accordance with the medium characteristics.

[Seventh Embodiment]

In the first embodiment, reproducing power adjustment is performed by using one monitor parameter. In the seventh embodiment, description will be made on an example of the structure of a super-resolution compatible optical disc apparatus for performing reproducing power adjustment by using a plurality of monitor parameters. The whole structure of the optical disc apparatus described in this embodiment is the same as that of the first embodiment.

In the reproducing power adjustment of Pattern 2 of the first embodiment, an asymmetry value is used as a monitor parameter. An optimum reproducing power is calculated by using an asymmetry value, a reproducing power value and OPC parameters. The sixth embodiment describes that similar advantages to those of the first embodiment are obtained even if reproducing power adjustment is performed by using any of a resolution, a carrier level, a modulation factor, a signal level, an environment temperature and the like as the monitor parameter.

In this embodiment, when Step S13 of FIG. FIG. 7 of the first embodiment is executed, an optimum reproducing power is calculated by using a plurality of monitor parameter values, the reproducing power value and the OPC parameters. For example, if an asymmetry value and a resolution are used as the monitor parameters, the OPC parameter tables have OPC parameters for the asymmetry and resolution under each reproducing condition. Since a plurality of monitor parameters are used, the judgment unit 611 calculates at Step S13 optimum reproducing powers $P(n, m+1)_{asy}$ and $P(n, m+1)_{res}$ from the asymmetry value and resolution by referring to the secular information storage unit 610 and fixed information storage unit 612 in accordance with the equation (5). A calculation process is performed in accordance with predetermined calculation rules by using the two optimum reproducing powers to thereby determine optimum reproducing powers to be set to present reproducing powers. The calculation rules are stored in the fixed information storage unit 612. The judgment unit 611 refers to the calculation rules to calculate final optimum reproducing powers. In this embodiment, average values are used as the calculation rules to calculate the optimum reproducing powers of $P(n, m+1)_{asy}$ and $P(n, m+1)_{res})/2$. In the above-described calculation process, it is obvious that the number of monitor parameters is not limited to two, but three or more monitor parameters may also be used.

Figures 11A, 11B, 12:
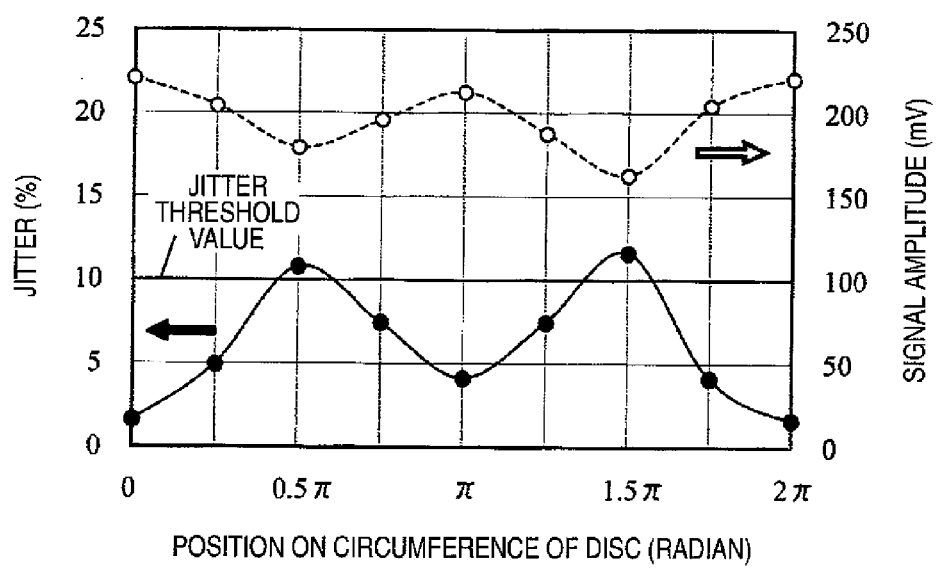
FIGS. 11A and 11B are diagrams illustrating weighting rules used for a weighted average of optimum reproducing power calculation when a reproducing power is adjusted by using a plurality of monitor parameters.
FIG. 12 is a graph illustrating an example of a relation between a position on one circumference of a medium, a jitter and an amplitude of a reproduced signal, wherein an L0 layer of a two-layer SIL medium with a super-resolution film is reproduced with a constant reproducing power.

Although a simple average value is used, monitor parameters may be weighted to use a weighted average. FIGS. 11A and 11B illustrate an example of the structure of a weight table to be referenced by the judgment unit 611 when an weighted average is calculated. For example, if four monitor parameters X1 to X4 are used, as illustrated in FIG. 11A an entry corresponding to a combination of four monitor parameters X1 to X4 is "15", the corresponding entry of a coefficient table of FIG. 11B is referred to. Since weighting coefficients to be used are a"1, a"1, a"3 and a"4, the judgment unit 611 calculates an optimum reproducing power $P(n, m+1)$ from $a''1 \times P(n, m+1)_{x1} + a''2 \times P(n, m+1)_{x2} + a''3 \times m+1)_{x3} + a''4 \times P(n, m+1)_{x4}$.

By using a plurality of monitor parameters, a calculation precision of each reproducing power adjustment is able to be improved.

[Eighth Embodiment]

In the first embodiment, judgment of whether an optimum reproducing power is required to be calculated is always performed at Step S12 during normal reproducing. If Step S12 in FIG. 7 is omitted and the flow is always made to skip from Step S11 to Step S13, more optimum reproducing than the first embodiment is realized. In the first embodiment, if a difference between the present monitor parameter value and monitor parameter target value is the monitor parameter error threshold value or smaller, an optimum reproducing power is not calculated at Step S13. Therefore, reproducing may be performed at a reproducing power shifted from an optimum reproducing power corresponding to the monitor parameter error threshold value. However, by omitting Step S12, reproducing is performed always at an optimum reproducing power. Further, by omitting Step S12, a time for judgment is unnecessary so that it is possible to respond quickly a change in the reproducing condition. This is effective for a short period change in the reproducing condition in one circumference of an optical disc.

There arises an issue that since an optimum reproducing power continues to be calculated at Step S13, a calculation amount increases and a processing circuit scale may become large. Therefore, whether Step S12 is omitted or not is determined in accordance with the quality of an optical disc to be reproduced. In this embodiment, the index m incrementing by 1 each time Step S13 is executed is not the number of changes in the reproducing condition but the number of times executing Step S13 itself.

[Ninth Embodiment]

This embodiment describes execution results of reproducing power adjustment using a resolution as a monitor parameter in which an SIL medium having a super-resolution film is used as an optical disc, and an optical disc apparatus super-resolution reproduces the optical disc.

An optical disc is a two-layer medium, the information recording layer (L1 layer) on the front side as viewed from a light incidence side is constituted of the management information area and a user information area, and the layer (L0 layer) on the bottom side is constituted of only a user information area. Both the layers each have a super-resolution film, and a cover layer is formed on the L1 layer. Similar to FIG. 4, the management information of the L1 layer is constituted of DI information of an optical disc, address information indicating positions of various information, an OPC parameter table and OPC execution judgment information. In this embodiment, since a resolution is used as the monitor parameter, parameters regarding the resolution are recorded in the OPC parameter table and OPC execution judgment information. A track pitch in the management information area and user information area is 100 nm and signals are recorded by 1-7 modulation. The shortest pit length in the management information area is 50 nm, whereas the shortest pit length in the user information area is 25 nm. Therefore, if an optical disc is reproduced at a wavelength of 405 nm with a pickup having an objective lens of NA=1.85, super-resolution reproducing is required for the user information area, whereas the management information area is able to be reproduced by normal resolution reproducing. Since address information is recorded by wobble signals in the whole area of an optical disc, a seek operation to a target reproducing position is able to be realized by normal resolution reproducing.

Description will now be made on an example of the structure of an optical disc apparatus capable of reproducing an optical disc of the embodiment. The optical disc apparatus of the embodiment is an optical disc apparatus with SIL, and drives a SIL optical disc having two information recording layers. A numerical aperture NA of an objective lens mounted on an optical pickup unit is 1.85 larger than 1. A wavelength of LD is 405 nm same as that of the first embodiment. Since the structure other than the optical pickup unit is the same as that of the optical disc apparatus illustrated in FIG. 6, description of the whole structure of the optical disc apparatus will not be duplicated.

Description will then be made on reproducing results of the two-layer optical disc in accordance with the flow of FIG. 7.

As an optical disc is set to an optical disc apparatus and a reproducing operation starts (S0), the optical disc apparatus rotates the optical disc at a constant linear velocity (CLV) of 4.92 m/s and radiates a reproducing laser beam at a power of 0.3 mW to a management information area (S1). Similar to reproducing adjustment of conventional optical disc techniques, reproducing adjustment such as spherical aberration, focus, tracking, and tilt is performed (S2), and thereafter the management information area is reproduced (S3) to acquire management information including DI information, address information, an OPC parameter table, and OPC execution judgment information. The acquired address information contains addresses 4 and 5 indicating the positions of the user areas to be reproduced in this embodiment. The acquired OPC execution judgment information contains a resolution error threshold value ΔRth=2% and a jitter threshold value Jth=10%. The reproducing laser beam moves to the address 4 of the user information area from which reproducing starts (S4) to execute the judgment A whether OPC parameters are required to be generated (S5) in accordance with the flow of FIG. 7. In this case, considering that the address 4 is near at a radius of 30 mm of the L1 layer and considering the present reproducing linear velocity of 4.92 m/s and environment temperature of 25° C., the present reproducing condition is the reproducing condition 21.

At the next Step S7, the OPC parameters of the reproducing condition 21 are set as the OPC parameters to be presently used, and the recommended reproducing power of the OPC parameters is set to the reproducing power at Step S8 to thereafter start a normal reproducing operation at Step S9.

Apart from the flow of FIG. 7, a jitter level and an amplitude of reproduced signals are measured at this time along one circumference of the optical disc. The amplitude was constant along one circumference, and the jitter value was always 5% or lower which is smaller than the jitter threshold value Jth. It is confirmed from these facts that a thickness of the cover layer of the L1 layer is constant along one circumference, and a size of a super-resolution spot during super-resolution reproducing is always constant along one circumference.

Reverting to the flow of FIG. 7, normal reproducing is performed at the position of the address 4. The following operation is repetition of Steps S10, S11 and Step S12. A jitter level measured at Step S11 is always 4 to 6% which is smaller than the jitter threshold value Jth=10%, and a difference between a resolution value and resolution target value is always 1% or smaller which is smaller than the resolution error threshold value ΔRth=2%. It is therefore confirmed that optimum reproducing is realized by adjusting the reproducing power in accordance with the flow of FIG. 7.

Next, the reproducing position is changed from the address 4 to the address 5 near at a radius of 30 mm of the L0 layer. Since Step S10 is executed in a state that an event of a change in the reproducing position is estimated, the flow advances to Step S16.

At Step S16 the normal reproducing operation is intercepted, and at Step S17 the reproducing position is changed to thereafter advance to Step S5. The present reproducing condition corresponds to the reproducing condition 22 in the OPC parameter table, and there exist the OPC parameters under the reproducing condition 22. It is therefore judged at Step S5 that it is not required to generate the OPC parameters. At next Step S7, the OPC parameters of the reproducing condition 22 are set as present OPC parameters. At Step S8 the recommended reproducing power (8) is set as a reproducing power, and at Step S9 the normal reproducing operation starts.

Again apart from the flow of FIG. 7, as a jitter level and an amplitude of reproduced signals are measured at this time along one circumference of the optical disc, a large variation is observed in this case. FIG. 12 illustrates measurement results of a jitter level and amplitude at each position along one circumference. A reproducing power is constant at the recommended reproducing power under the reproducing condition 22. A signal amplitude reduces at some positions, and a jitter level increases correspondingly. At the worst, the jitter value exceeds the threshold value Jth=10% and optimum reproducing is unable to be realized. This is because a thickness of an intermediate layer between the L0 and L1 changes in one circumference of the optical disc. As the thickness shifts from the optimum value, an optical spot defocuses and a signal amplitude changes. It is therefore confirmed that it is difficult to reproduce an SIL medium with a super-resolution film at a constant reproducing power. Since the signal amplitude change results from defocus of a reproducing spot caused by a thickness distribution of the intermediate layer, this change also occurs during normal resolution reproducing.

Figure 13:
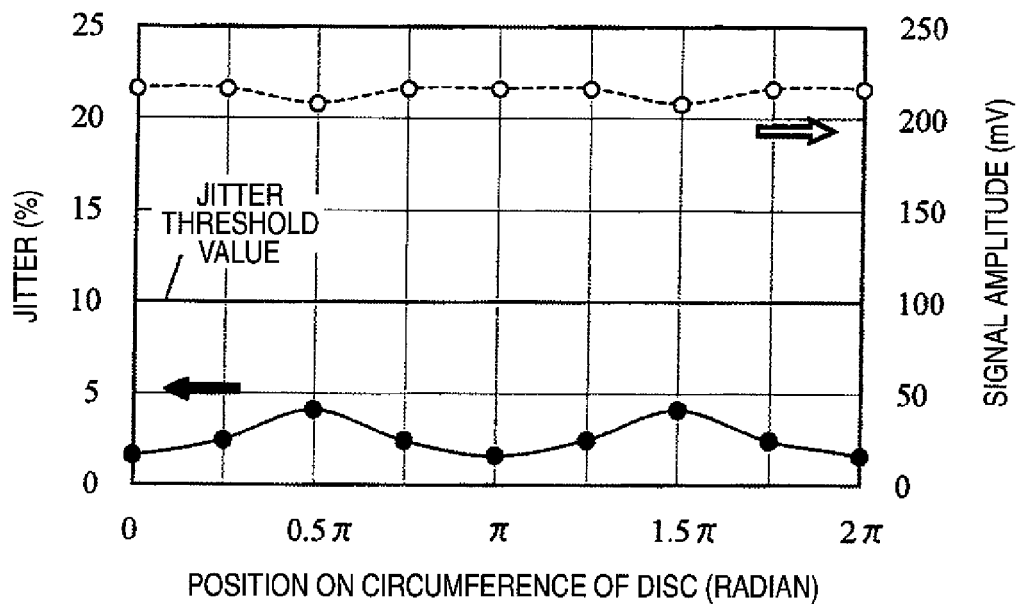
FIG. 13 is a graph illustrating an example of a relation between a position on one circumference of a medium, a jitter and an amplitude of a reproduced signal, wherein an L0 layer of a two-layer SIL medium with a super-resolution film is reproduced by adjusting a reproducing power.

Reverting to the flow of FIG. 7, after the normal resolution reproducing at the address 5, the operation to follow includes two routes: a route of Steps S10→S11→S12→S10 and a route of Steps S10→S11→S12→S13→S14→S10. In the former case, it is unnecessary to generate OPC parameters and calculate an optimum reproducing power, and possible to continue normal resolution reproducing always at the same reproducing power. In the latter case, although it is unnecessary to generate OPC parameters, it is necessary to calculate an optimum reproducing power and change a reproducing power. FIG. 13 illustrates a jitter level and amplitude at each position along one circumference obtained by performing reproducing along these routes. As different from FIG. 12, a jitter level is always 5% or smaller which is smaller than the jitter threshold value Jth=10%, and the amplitude is almost constant along one circumference. It is therefore confirmed that by performing reproducing power adjustment in accordance with the flow of FIG. 7, optimum reproducing is realized by always setting an optimum reproducing power based upon the monitor parameter and maintaining constant the amplitudes of reproduced signals.

It is therefore confirmed from these facts that optimum reproduced signals are able to be obtained by performing reproducing power adjustment even during super-resolution reproducing using a super-resolution film for a SIL medium. It is further confirmed that it is possible to suppress a reproduced signal quality from being degraded by a thickness variation of an intermediate film of a SIL-based multilayer, by forming a super-resolution film on a SIL medium and performing reproducing with reproducing power adjustment. Similarly, it is confirmed that it is possible to suppress a reproduced signal quality from being degraded by a thickness variation of a cover layer, by forming a super-resolution film on a SIL medium and performing reproducing with reproducing power adjustment. These confirmations indicate that although a SIL itself does not have a means for suppressing an amplitude change due to defocus, a combination of SIL and super-resolution reproducing allows a reproducing power of super-resolution reproducing to suppress an amplitude change, so that reproducing power adjustment is able to suppress an amplitude change due to defocus.

[Tenth Embodiment]

This embodiment describes a method of determining a partial response (PR) coefficient of partial-response minimum-likelihood (PRML) of reproduced signal processing.

A bER value of reproduced signals depends on PR coefficients and a reproducing power. It is therefore necessary to determine optimum values of both the PR coefficients and reproducing power.

In this embodiment, recommended values PR coefficients and a reproducing power are recorded as emboss data in a control data area of a medium, and reproducing learning by a drive is performed based on the emboss data to obtain optimum values of the PR coefficients and reproducing power.

A medium used is a single layer read only memory (ROM) medium and has the following structure: 1.1 mm thick polycarbonate substrate/Ag (100 nm)/ZnS—SiO$_2$ (40 nm)/GeSbTe (10 nm)/ZnO—SiO$_2$ (50 nm)/0.1 mm thick polycarbonate sheet. A laser beam of a drive is made incident upon the side of the 0.1 mm thick polycarbonate sheet. Pit data is recorded in the polycarbonate substrate. Its modulation code is 1-7 PP adopted by BD, and a length of 1 T is 37.5 mm which is a four-fold of BD. A track pitch is 320 nm same as that of BD. Namely, this medium has a record capacity of 100 GB which is a four-hold of BD. A pit depth is set to 35 nm.

Recommended values of PR coefficients and a reproducing power are recorded as pit digital data in the control data area of the 1.1 mm thick polycarbonate substrate.

There are two reasons why the sign of a center value of the PR coefficients is opposite to the sing of the other coefficients. One reason is that the PR coefficients have (1, 2, 0, 2, 1) as contribution of a normal resolution spot and the center value −4 as contribution of a super-resolution spot, and that the opposite sign of the center value of the PR coefficients is preferable if optical phases of the normal resolution spot and the super-resolution spot are opposite. Since the optical phase depends on disc design, it is not necessarily required to be an opposite sign, but each disc may have optimum values of the PR coefficients. The other reason is that a signal processed by the PR (1, 2, −4, 2, 1) coefficients has a property analogous to differentiation with time of a signal before processing, because a super-resolution reproduced signal is like a differential signal. The size and shape of a super-resolution spot change near at a mark edge with a local change in a shape, thermal absorption and thermal conduction due to existence of pits of ROM and marks of a recording type disk, during super-resolution reproducing. A reproduced signal changes therefore, and this change superposes a secular change upon a normal resolution reproducing signal so that the reproduced signal has a property analogous to differentiation with time of the reproduced signal.

Figure 14:
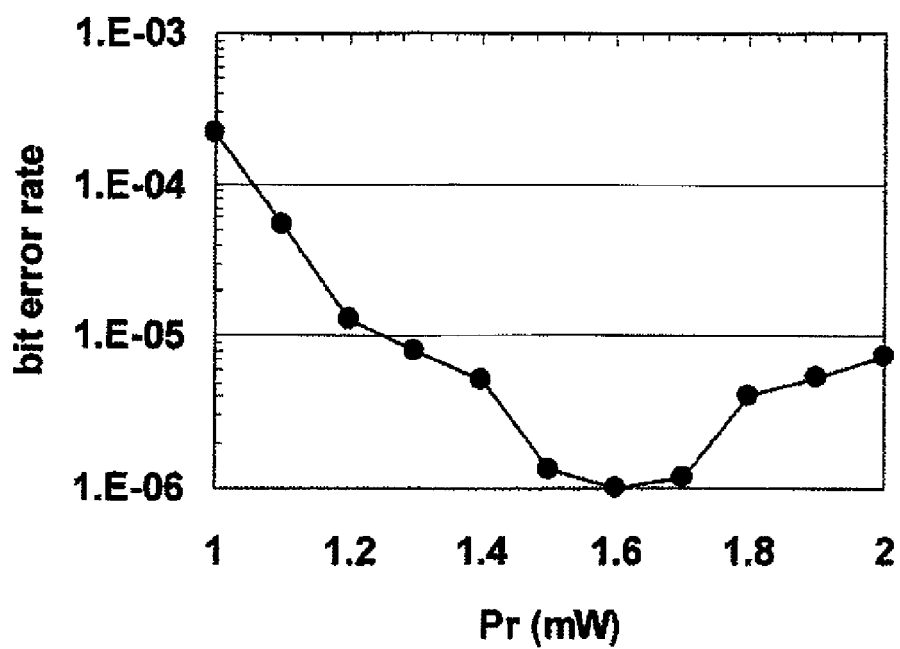
FIG. 14 illustrates a relation between a reproducing power Pr and a bER when signal processing for the medium of the tenth embodiment is performed by using PR(1, 2, −4, 2, 1).

In this embodiment, the PR coefficients are set to the recommended values (1, 2, −4, 2, 1), the reproducing power Pr is changed at a pitch of 0.1 mW in the range of 1 mW to 2 mW corresponding to ±30% of a recommended value of 1.5 mW. The measurement results are illustrated in FIG. 14. The number of data errors of one million bits was measured for each condition. In the measurement results in FIG. 14, a bER of $10^{-6}$ at Pr=1.6 mW indicates that no error was found. It is seen from this data that Pr=1.6 mW is an optimum reproducing power.

Figure 15:
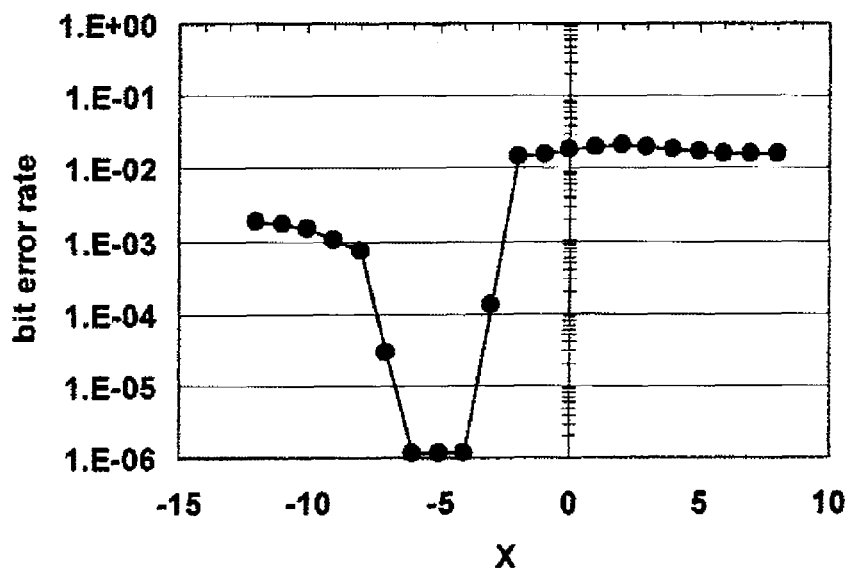
FIG. 15 illustrates a relation between an X and a bER when signal processing for the medium of the tenth embodiment is performed by using PR(1, 2, X, 2, 1) at a reproducing power Pr=1.6 mW.

Next, FIG. 15 illustrates measurement results of a relation between X and bER obtained by setting the PR coefficient to (1, 2, X, 2, 1) and changing X. Similar to FIG. 14, one million bits are measured for each condition, a bER of $10^{-6}$ indicates that no error was detected. It is seen from this data that optimum values are X=−4, −5 and −6. In this case, the center value of X=−5 is adopted. It is therefore sufficient if the range of values of about ±3 from the recommended value X is checked.

In this method, a reproducing power is first determined, and then the PR coefficients are determined. Even if the process order is reversed, the same results were obtained. However, as understood from the results illustrated in FIGS. 14 and 15, it is preferable to first determine the reproducing power because a margin of the reproducing power relative to the PS coefficients is smaller than that of bER.

Figure 16:
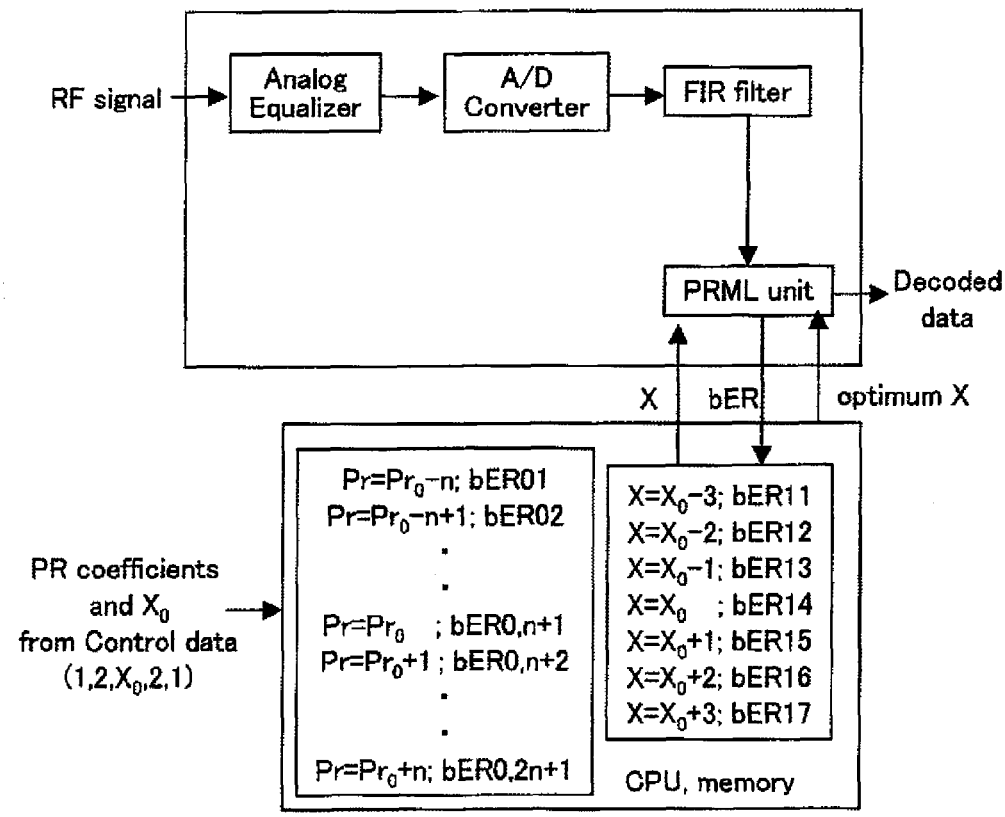
FIG. 16 is a block diagram of a signal processing system of a drive realizing the tenth embodiment.

Basing upon the above-described experiment results, a signal processing system having the structure illustrated in FIG. 16 is added to the drive. A signal processing method is equal to a conventional one. An input reproduced signal (RF signal) passes through an analog equalizer, an A/D converter, and an FIR filter, and Viterbi decoded by PRML. A CPU and a memory for determining PR coefficients are connected to the signal processing system. CPU stores the recommended reproducing power $P_{r0}$, PR coefficients and its variable $X_o$ read from the control data. It is herein assumed that the PR coefficients and variable stored in the control data are (1, 2, $X_o$, 2, 1) and Xo, respectively. Xo is a specific numeral such as −4.

First, an optimum reproducing power is searched from the PR coefficients (1, 2, $X_o$, 2, 1). (2n+1)Pr values around $Pr_o$ are changed at a pitch of 0.1 mW to measure and store bER values. Pr providing the lowest bER value among the bER values is used as an optimum reproducing power.

Thereafter, bER values (bER1 to bER7) are measured at the optimum reproducing power by setting X of the PR coefficients (1, 2, X, 2, 1) to $X_o$−3 to $X_o$+3 and stored in a memory. X providing the lowest bER among seven bER values is selected as an optimum X which is transferred to the PRML unit.

[Eleventh Embodiment]

In this embodiment, the tenth embodiment is applied to a two-layer medium.

Of the two layers, the structure of the L0 layer on the bottom side as viewed from a light incidence side is the same as that of the tenth embodiment, excepting that a UV resin sheet of 25 μm thick is used in place of the polycarbonate sheet of 0.1 mm thick, and pit patterns of the front side layer (L1) to be formed next are formed on the UV resin sheet by nanoimprint. Thereafter, a thin film is formed: Ag (10 nm)/ZnO—SiO$_2$ (20 nm)/GeSbTe (10 nm)/ZnS—SiO$_2$ (80 nm)/a polycarbonate sheet of 0.1 mm thick. A transmissivity of L1 is set to about 60% so as to allow an L0 reproducing beam to efficiently reach L0. To this end, a thickness of the Ag thin film of L1 is made thin.

As the reproducing condition, different PR conditions and different reproducing powers are used for L0 and L1 because L0 and L1 have different effective light powers reaching GeSbTe and different shapes of super-resolution spots. Similar to the tenth embodiment, recommended reproducing powers and PR coefficients of the L0 and L1 layers are recorded in the control data areas as pit data. The recommended reproducing powers are set to 2.5 mW for L1 and 1.2 mW for L1, and the recommended PR coefficients are set to (1, 2, −4, 2, 1) for L0 and (1, 2, 2, −3, 1) for L1. The reason why asymmetric coefficients are set to L1 will be described below. Since the Ag film of L1 is thin, heat generated in GeSbTe is hard to be diffused, and the super-resolution spot is formed at a delayed position from the center of a normal resolution spot as viewed along an optical spot traveling direction. Contribution of a super-resolution spot is delayed in a reproduced signal. This delay is represented by asymmetric coefficients.

Figure 17:
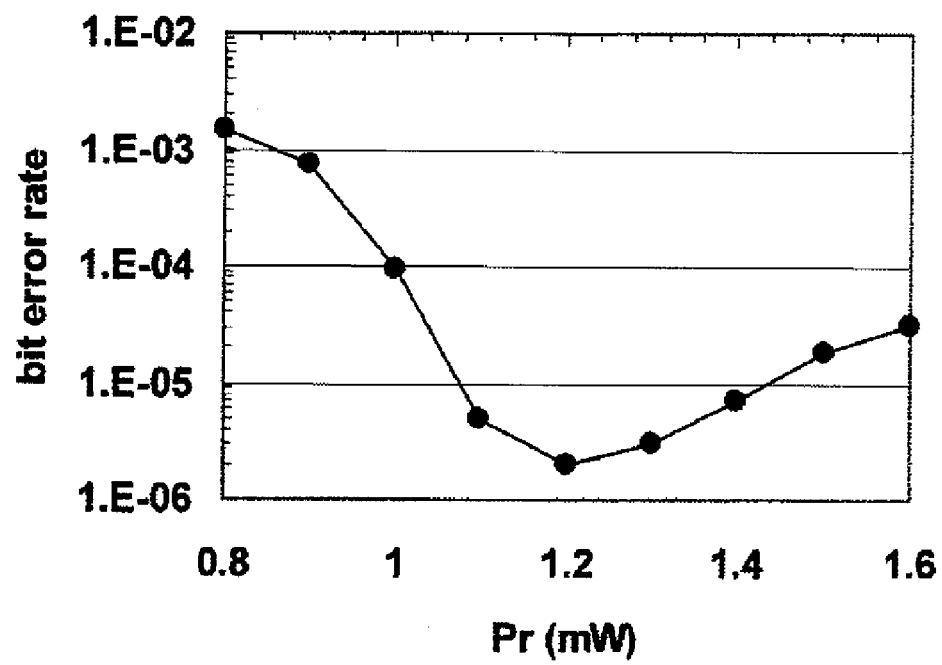
FIG. 17 illustrates a relation between a reproducing power Pr and a bER when signal processing for the L1 layer of the two-layer medium of the eleventh embodiment is performed by using PR(1, 2, 2, −3, 1).

The drive determines first the PR coefficients and a reproducing power of L1. Similar to the tenth embodiment, the PR coefficients are set to the recommended values, the reproducing power Pr is changed at a pitch of 0.1 mW in the range of 0.8 to 1.6 mW corresponding to ±30% of a recommended value. The number of data errors was detected when one million bits were reproduced. The bER is illustrated in FIG. 17. As illustrated in FIG. 17, the numbers of errors at the least are $2 \times 10^{-6}$ at a reproducing power Pr=1.2 mW and $3 \times 10^{-6}$ at a reproducing power Pr=1.3 mW, among the reproducing powers used. However, 2 to 3 bit errors are recognized. At an intermediate power of 1.25 mW, a bER was measured again and no error was detected. A reproducing power for L1 is therefore determined as 1.25 mW. In order to deal with this case, CPU illustrated in FIG. 16 is provided with an additional function of measuring again a bER at an intermediate power between two reproducing powers providing smallest bER values when errors are detected near at the lowest bER.

Figure 18:
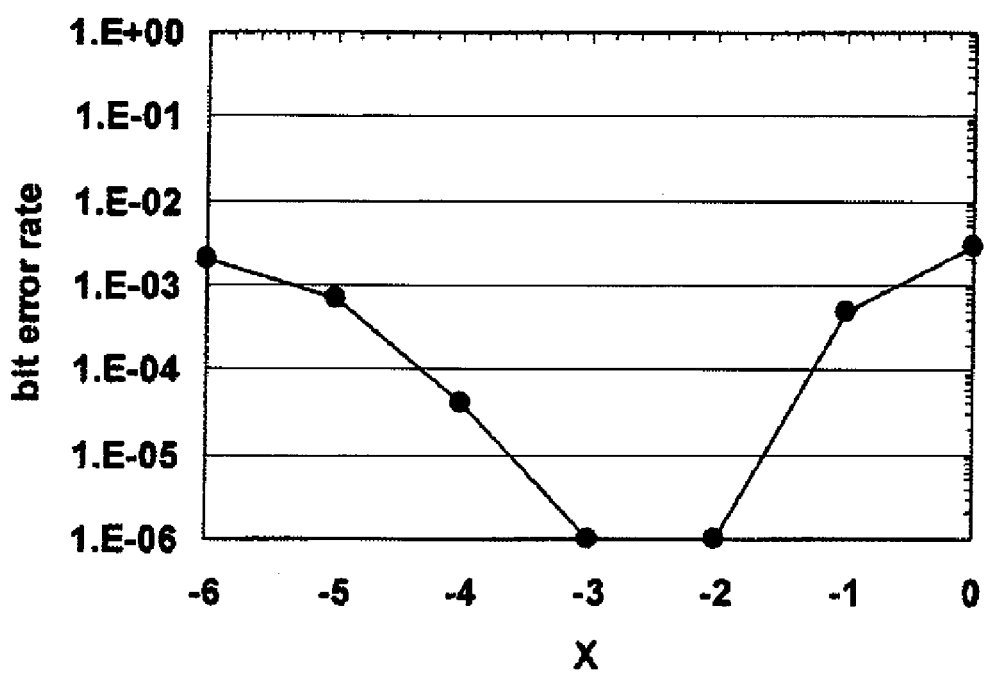
FIG. 18 illustrates a relation between an X and a bER when signal processing for the L1 layer of the two-layer medium of the eleventh embodiment is performed by using PR(1, 2, 2, X, 1) at a reproducing power Pr=1.25 mW.

Next, the PR coefficients for L1 are optimized. FIG. 18 illustrates measurement results of a bER at a fixed Pr=1.25 mW and the PR coefficients (1, 2, 2, X, 1) changing X from 0 to −6. It is seen from the measurement results that no error is detected at X=−2 and −3. To deal with this case, CPU in FIG. 16 is provided with the function of adopting X=−3 because a lower bER is obtained at X=−4 than at X=−3 as seen from the results illustrated in FIG. 18 and it is judged that a wider margin is acquired at X=−3.

Next, PR coefficients and a reproducing power for Lo are determined. Similar to the above description, a reproducing power is first determined and then the PR coefficients are determined. As Pr is changed at a pitch of 0.1 mW in the range of 1.7 to 3.3 mW corresponding to ±30% of a recommended Pr value of 2.5 mW, no error is detected only at 2.5 mW so that the reproducing power is set to Pr=2.5 mW. Thereafter, as X of the PR coefficients (1, 2, X, 2, 1) is changed from −1 to −7, no error is detected at Z=−3, −4 and −5 so that X=4 is adopted.

This method is also applicable to a multilayer medium having three or more layers. Although the recommended power and PR coefficients are recorded in each layer as pit data, the recommended powers and PR coefficients may be collectively recorded in one layer, or the recommended values for all layers may be recorded in all layers.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reproducing power adjusting method of adjusting a reproducing power to be used for super-resolution reproducing, comprising steps of:
   observing a monitor parameter as an index reflecting a reproducing condition of said super-resolution reproducing;
   judging whether or not the reproducing condition of super-resolution has changed; and
   when it is judged that the reproducing condition of super-resolution has changed, resetting a target value of said monitor parameter in accordance with said changed reproducing condition, and
   adjusting said reproducing power so as to make said monitor parameter coincident with said target value which has been reset after a change in said reproducing condition.

2. The reproducing power adjusting method according to claim 1, further comprising:
   an optimum power control (OPC) parameter specific to an information recording medium to be subjected to said super-resolution reproducing, including at least a target value of said monitor parameter.

3. The reproducing power adjusting method according to claim 2, wherein said OPC parameter is changed with said reproducing condition.

4. The reproducing power adjusting method according to claim 2, wherein:
   two or more monitor parameters are used;
   an average optimum reproducing power to be obtained by weighted average of a predetermined rule is calculated by using each optimum reproducing power calculated by using each monitor parameter, said reproducing power and said OPC parameter; and
   said reproducing power is changed to said average optimum reproducing power.

5. The reproducing power adjusting method according to claim 2, wherein:
   said OPC parameter is acquired as table type information in correspondence with said reproducing condition; and
   said OPC parameter corresponding to said reproducing condition is determined as an OPC parameter corresponding to a present reproducing condition, by referring to said table type information.

6. The reproducing power adjusting method according to claim 1, wherein said reproducing condition is indexed by at least one or more of a reproducing position, a reproducing linear velocity and an environment temperature.

7. An information recording/reproducing apparatus provided with a function of performing super-resolution reproducing for a predetermined information recording medium, comprising:
   a means for acquiring a super-resolution reproduced signal from said information recording medium;
   a means for acquiring information recorded in said information recording medium as digital data, from said reproduced signal; and
   an information processing means for performing predetermined information processing relative to said acquired digital data, including: calculating a reproducing power and a monitor parameter as an index reflecting a reproducing condition of said super-resolution reproducing, and judging whether the reproducing condition of super-resolution has changed;
   wherein:
   when said information processing means judges that the reproducing condition of super-resolution has changed, a target value of said monitor parameter is reset in accordance with said changed reproducing condition, and
   said reproducing power is calculated so as to make said monitor parameter coincident with said target value which has been reset after a change in said reproducing condition.

8. The information recording/reproducing apparatus according to claim 7, further comprising:
   an optimum power control (OPC) parameter specific to an information recording medium to be subjected to said super-resolution reproducing, including at least a target value of said monitor parameter;

wherein said information processing means changes said OPC parameter in accordance with said reproducing condition.

9. The information recording/reproducing apparatus according to claim 8, further comprising:
a means for acquiring two or more of said monitor parameter;
a means for calculating each optimum reproducing power by using each monitor parameter, said reproducing power and said OPC parameter;
a means for calculating an average optimum reproducing power to be obtained by weighted average of a predetermined rule; and
a means for changing said reproducing power is changed to said average optimum reproducing power.

10. The information recording/reproducing apparatus according to claim 8, further comprising:
a means for acquiring said OPC parameter from said optical information recording medium; and
a means for calculating said optimum reproducing power by using said acquired OPC parameter.

11. The information recording/reproducing apparatus according to claim 8, further comprising:
a means for acquiring said OPC parameter from a storage unit of the information recording/reproducing apparatus; and
a means for calculating said optimum recording power by using said acquired OPC parameter.

12. The information recording/reproducing apparatus according to claim 8, further comprising:
a means for storing said OPC parameter in a storage unit of an optical information recording apparatus as table type information in correspondence with said reproducing condition; and
a means for determining said OPC parameter corresponding to said reproducing condition by referring to said table type information.

13. The information recording/reproducing apparatus according to claim 12, further comprising:
a means for changing said OPC parameter of a second reproducing condition of said table type information, when said optimum reproducing power of said second reproducing condition contained in a first reproducing condition is unable to be calculated properly by using said OPC parameter corresponding to said first reproducing condition.

14. The information recording/reproducing apparatus according to claim 8, further comprising:
a means for changing said OPC parameter when said optimum reproducing power is unable to be calculated properly by using said OPC parameter corresponding to said reproducing condition.

15. The information recording/reproducing apparatus according to claim 8, further comprising:
a means for recording said OPC parameter in a predetermined area of an information recording medium and/or in a predetermined storage unit of the information recording/reproducing apparatus.

16. The information recording/reproducing apparatus according to claim 7, further comprising:
a means for acquiring at least one of: a reproducing position, a reproducing linear velocity and a temperature of said information recording medium.

17. An information recording/reproducing apparatus configured to perform super-resolution reproducing for a predetermined information recording medium, the apparatus comprising:
a first acquisition unit configured to acquire a super-resolution reproduced signal from said information recording medium;
a second acquisition unit configured to acquire information recorded in said information recording medium as digital data, from said reproduced signal; and
an information processing unit configured to perform predetermined information processing relative to said acquired digital data, said information processing including:
calculating a reproducing power, and a monitor parameter as an index reflecting a reproducing condition of said super-resolution,
judging, based on said monitor parameter, whether the reproducing condition of said super-resolution has changed, and
wherein when said information processing unit judges that the reproducing condition of super-resolution has changed, resetting a target value of said monitor parameter in accordance with said changed reproducing condition, and calculating said reproducing power so as to make said monitor parameter coincident with said target value.

18. The information recording/reproducing apparatus according to claim 17, further comprising:
an optimum power control (OPC) parameter specific to an information recording medium to be subjected to said super-resolution reproducing, including at least a target value of said monitor parameter; and
wherein said information processing unit is configured to change said OPC parameter in accordance with said reproducing condition.

19. The information recording/reproducing apparatus according to claim 17, further comprising:
a third acquisition unit configured to acquire at least one of: a reproducing position, a reproducing linear velocity and a temperature of said information recording medium.

* * * * *